United States Patent
Yang et al.

(10) Patent No.: US 11,228,385 B2
(45) Date of Patent: *Jan. 18, 2022

(54) BROADCASTING SIGNAL TRANSMITTING APPARATUS, BROADCASTING SIGNAL RECEIVING APPARATUS, BROADCASTING SIGNAL TRANSMITTING METHOD, AND BROADCASTING SIGNAL RECEIVING METHOD

(71) Applicant: LG ELECTRONICS INC., Seoul (KR)

(72) Inventors: Seungryul Yang, Seoul (KR); Minsung Kwak, Seoul (KR); Woosuk Ko, Seoul (KR); Sungryong Hong, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,948

(22) Filed: Jan. 22, 2021

(65) Prior Publication Data

US 2021/0143927 A1    May 13, 2021

Related U.S. Application Data

(63) Continuation of application No. 15/579,405, filed as application No. PCT/KR2016/007897 on Jul. 20, 2016, now Pat. No. 10,917,186.

(Continued)

(51) Int. Cl.
*H04H 60/76* (2008.01)
*H04L 29/06* (2006.01)
(Continued)

(52) U.S. Cl.
CPC ............ *H04H 60/76* (2013.01); *H04H 60/09* (2013.01); *H04H 60/35* (2013.01); *H04H 60/72* (2013.01); *H04L 29/06* (2013.01); *H04L 67/02* (2013.01)

(58) Field of Classification Search
None
See application file for complete search history.

(56) References Cited

U.S. PATENT DOCUMENTS 6,745,223 B1 *  6/2004  Nobakht ............ H04N 7/17318
                                                          709/200
7,150,029 B1 * 12/2006  Ebling ............... H04N 21/4147
                                                          725/39
(Continued)

FOREIGN PATENT DOCUMENTS

CN     103944683 A  *  7/2014  ........... H04L 1/0065
CN     104737549 A      6/2015
(Continued)

OTHER PUBLICATIONS

U.S. Appl. No. 15/579,405, filed Dec. 4, 2017.
(Continued)

*Primary Examiner* — An Son P Huynh
(74) *Attorney, Agent, or Firm* — Birch, Stewart, Kolasch & Birch, LLP

(57) ABSTRACT

A method for processing a broadcast service at a Primary Device (PD), and which includes performing a discovery process with a Companion Device (CD) application in a CD by receiving a discovery request from the CD and providing an endpoint for a WebSocket server of the PD; establishing a connection between the WebSocket server and the CD application based on the endpoint; in response to receiving a query for a current service from the CD, transmitting a response for the current service to the CD application based on the connection; receiving a broadcast signal having (Continued)

signaling information including flag information to obtain emergency data in the broadcast signal; and time de-interleaving Forward Error Correction (FEC) blocks including the emergency data based on a Time Interleaving (TI) block, wherein the FEC blocks are de-interleaved based on position for one or more virtual FEC blocks and the FEC blocks. In addition, the signaling information further includes information for a maximum number for the FEC blocks. The method also includes transmitting a notification message including the emergency data to the CD.

8 Claims, 27 Drawing Sheets

Related U.S. Application Data

(60) Provisional application No. 62/194,841, filed on Jul. 21, 2015, provisional application No. 62/197,588, filed on Jul. 28, 2015, provisional application No. 62/206,858, filed on Aug. 19, 2015, provisional application No. 62/211,851, filed on Aug. 30, 2015.

(51) Int. Cl.
*H04H 60/09* (2008.01)
*H04H 60/35* (2008.01)
*H04H 60/72* (2008.01)
*H04L 29/08* (2006.01)

(56) References Cited

U.S. PATENT DOCUMENTS

| | | | | |
|---|---|---|---|---|
| 7,650,361 | B1* | 1/2010 | Wong | H04N 21/4722 707/999.107 |
| 7,757,251 | B2* | 7/2010 | Gonder | H04N 21/47202 725/39 |
| 8,863,196 | B2* | 10/2014 | Patil | H04N 21/42216 725/53 |
| 9,172,705 | B1* | 10/2015 | Kong | H04L 63/10 |
| 9,331,890 | B1* | 5/2016 | Fallows | H04L 29/0653 |
| 9,432,431 | B2* | 8/2016 | O'Malley | H04L 65/4084 |
| 9,948,416 | B2* | 4/2018 | Lee | H04N 21/6125 |
| 10,687,121 | B2* | 6/2020 | Yang | H04N 21/236 |
| 2002/0034214 | A1* | 3/2002 | Okada | H04L 5/023 375/147 |
| 2004/0078624 | A1* | 4/2004 | Maxemchuk | H04L 12/1886 714/4.2 |
| 2006/0248563 | A1* | 11/2006 | Lee | H04H 60/07 725/117 |
| 2007/0233759 | A1* | 10/2007 | Tomlinson | G06F 16/40 708/200 |
| 2009/0055868 | A1* | 2/2009 | Wehmeyer | H04N 7/163 725/40 |
| 2009/0061841 | A1* | 3/2009 | Chaudhri | H04L 65/1059 455/420 |
| 2009/0138784 | A1* | 5/2009 | Tamura | H04L 1/0026 714/776 |
| 2009/0150199 | A1* | 6/2009 | Cohen | G06Q 10/0637 705/7.36 |
| 2009/0160731 | A1* | 6/2009 | Schuler | G06F 3/1423 345/1.1 |
| 2009/0286469 | A1* | 11/2009 | Jeong | H04N 21/8153 455/3.06 |
| 2010/0095328 | A1* | 4/2010 | Hartung | H04N 21/4532 725/46 |
| 2010/0153985 | A1* | 6/2010 | Dey | H04N 21/43615 725/25 |
| 2010/0154023 | A1* | 6/2010 | Dey | H04N 21/4508 725/151 |
| 2010/0192183 | A1* | 7/2010 | Hu | H04N 21/6175 725/62 |
| 2010/0251292 | A1* | 9/2010 | Srinivasan | H04N 21/440218 725/37 |
| 2010/0281107 | A1* | 11/2010 | Fallows | H04L 67/42 709/203 |
| 2010/0289943 | A1* | 11/2010 | Tokoro | H04H 40/27 348/425.2 |
| 2010/0309383 | A1* | 12/2010 | Matsumura | H04L 25/0232 348/725 |
| 2011/0069940 | A1* | 3/2011 | Shimy | H04N 5/44543 386/296 |
| 2011/0107379 | A1* | 5/2011 | Lajoie | H04L 65/1016 725/87 |
| 2011/0126232 | A1* | 5/2011 | Lee | H04N 21/6408 725/39 |
| 2011/0164175 | A1* | 7/2011 | Chung | H04N 21/4126 348/468 |
| 2011/0167468 | A1* | 7/2011 | Lee | H04N 21/4758 725/132 |
| 2011/0246621 | A1* | 10/2011 | May, Jr. | G06F 16/4387 709/219 |
| 2012/0158825 | A1* | 6/2012 | Ganser | H04L 67/02 709/203 |
| 2012/0260275 | A1* | 10/2012 | Lee | H04H 60/63 725/9 |
| 2012/0304245 | A1* | 11/2012 | Lawson | H04L 63/08 726/1 |
| 2013/0027613 | A1* | 1/2013 | Kim | H04N 21/43637 348/563 |
| 2013/0027813 | A1 | 1/2013 | Kim et al. | |
| 2013/0036442 | A1* | 2/2013 | Wingert | H04N 21/42209 725/60 |
| 2013/0047180 | A1* | 2/2013 | Moon | H04N 21/4126 725/30 |
| 2013/0094617 | A1* | 4/2013 | Shirosugi | H04N 21/4348 375/340 |
| 2013/0145403 | A1* | 6/2013 | Sotos | H04N 21/4126 725/62 |
| 2013/0152135 | A1* | 6/2013 | Hong | H04N 21/4622 725/51 |
| 2013/0173765 | A1* | 7/2013 | Korbecki | H04N 21/42209 709/221 |
| 2013/0330055 | A1* | 12/2013 | Zimmermann | H04N 21/2743 386/240 |
| 2014/0044123 | A1* | 2/2014 | Lawson | H04L 65/1069 370/352 |
| 2014/0052986 | A1* | 2/2014 | Kanai | H04L 63/0428 713/168 |
| 2014/0052988 | A1 | 2/2014 | Kanai et al. | |
| 2014/0086445 | A1* | 3/2014 | Brubeck | H04N 21/26258 382/100 |
| 2014/0108618 | A1* | 4/2014 | Lee | H04L 12/2838 709/219 |
| 2014/0109128 | A1* | 4/2014 | Lee | H04N 21/4622 725/25 |
| 2014/0129618 | A1* | 5/2014 | Panje | H04N 21/26258 709/203 |
| 2014/0149832 | A1* | 5/2014 | Ko | H03M 13/13 714/790 |
| 2014/0181631 | A1* | 6/2014 | Lund | H04L 67/10 715/234 |
| 2014/0181831 | A1 | 6/2014 | Lund | |
| 2014/0280906 | A1* | 9/2014 | Johns | H04L 45/28 709/224 |
| 2014/0282777 | A1* | 9/2014 | Gonder | H04N 21/64322 725/109 |
| 2014/0282784 | A1* | 9/2014 | Pfeffer | H04N 21/8586 725/112 |
| 2014/0310599 | A1* | 10/2014 | Clift | H04N 21/4227 715/719 |
| 2014/0330976 | A1* | 11/2014 | van Bemmel | H04L 69/16 709/226 |
| 2014/0359057 | A1* | 12/2014 | Hensgen | H04N 21/4126 709/217 |
| 2015/0003809 | A1* | 1/2015 | Matsuda | G11B 27/105 386/248 |

(56) References Cited

U.S. PATENT DOCUMENTS

| | | | |
|---|---|---|---|
| 2015/0012952 A1* | 1/2015 | Sato | H04N 21/8133 725/74 |
| 2015/0100978 A1* | 4/2015 | Isozaki | H04N 21/63345 725/31 |
| 2015/0120290 A1* | 4/2015 | Shagalov | G10L 15/083 704/231 |
| 2015/0142475 A1* | 5/2015 | Rusin | H04L 67/12 705/3 |
| 2015/0155967 A1* | 6/2015 | Kim | H03M 13/1102 375/295 |
| 2015/0156551 A1* | 6/2015 | Maruyama | H04N 21/4782 725/51 |
| 2015/0158551 A1 | 6/2015 | Maruyama | |
| 2015/0169648 A1* | 6/2015 | Foebel | H04L 67/42 707/609 |
| 2015/0229507 A1* | 8/2015 | Kim | H04L 27/2646 375/260 |
| 2015/0339745 A1* | 11/2015 | Peter | G06Q 30/0615 705/26.42 |
| 2015/0341472 A1* | 11/2015 | Yanofski | H04L 51/04 709/203 |
| 2015/0375106 A1* | 12/2015 | Liu | A63F 13/211 463/31 |
| 2016/0006817 A1* | 1/2016 | Mitic | H04L 65/80 709/232 |
| 2016/0142752 A1* | 5/2016 | Ohno | H04N 21/2402 725/116 |
| 2016/0205185 A1* | 7/2016 | Gampel | H04L 67/02 709/218 |
| 2016/0330525 A1* | 11/2016 | Freeman | H04N 21/2665 |
| 2017/0006322 A1* | 1/2017 | Dury | A63F 13/49 |
| 2017/0008322 A1 | 1/2017 | Dury et al. | |
| 2017/0055041 A1* | 2/2017 | Zhu | H04N 21/2187 |
| 2017/0244992 A1* | 8/2017 | Deshpande | G06F 21/10 |
| 2017/0272488 A1* | 9/2017 | Totzke | H04L 67/02 |
| 2018/0027301 A1* | 1/2018 | Deshpande | H04N 21/43615 725/88 |
| 2018/0041810 A1* | 2/2018 | Deshpande | H04N 21/25866 |
| 2018/0077108 A1* | 3/2018 | Renaud | H04L 51/20 |

FOREIGN PATENT DOCUMENTS

| | | | | |
|---|---|---|---|---|
| CN | 104871552 A | 8/2015 | | |
| CN | 104969492 A | 10/2015 | | |
| CN | 105579995 A | 5/2016 | | |
| EP | 2461610 A1 * | 6/2012 | | H04W 4/90 |
| EP | 2750309 A1 | 7/2014 | | |
| KR | 10-2012-0004320 A | 1/2012 | | |
| KR | 10-2012-0093154 A | 8/2012 | | |
| KR | 10-2013-0059135 A | 6/2013 | | |
| KR | 10-2014-0080958 A | 7/2014 | | |
| WO | WO 2014/148813 A1 | 9/2014 | | |
| WO | WO 2015/041494 A1 | 3/2015 | | |
| WO | WO 2015/072763 A1 | 5/2015 | | |

OTHER PUBLICATIONS

"ATSC Candidate Standard: Interactive Service Standard (A/105:2014)," 2013, ATSC (Year: 2013).

"HbbTV 2.0 Specification," HbbTV (Feb. 2, 2015), pp. 1-249 (Year: 2015).

"HbbTV 2.0 Specification," HbbTV (May 1, 2015) (Year: 2015).

"HbbTV Version 2 Specification Draft 23 (Stable)," HbbTV (Year: 2015).

"Hybrid Broadcast Broadband TV," ETSI TS 102 796 V1.1.1 (Jun. 2010) (Year: 2010).

* cited by examiner

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | Use | Data Type |
|---|---|---|---|---|---|
| bundleDescription | | | | | |
| | userServiceDescription | | | | |
| | | @globalServiceID | | 1 | anyURL |
| | | @serviceID | | 1 | unsignedShort |
| | | @serviceStatus | | 0..1 | boolean |
| | | @fullMPDUri | | 1 | anyURL |
| | | @sTSIDUri | | 1 | anyURL |
| | | name | | 0..N | string |
| | | | @lang | 1 | language |
| | | serviceLanguage | | 0..N | language |
| | | capabilityCode | | 0..1 | string |
| | | deliveryMethod | | 1..N | |
| | | | broadcastAppService | 1..N | |
| | | | | basePattern | 1..N | string |
| | | | unicastAppService | 0..N | |
| | | | | basePattern | 1..N | string |

— t4010

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | SrcFlow | 0..1 | scrFlowType |
| | | RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
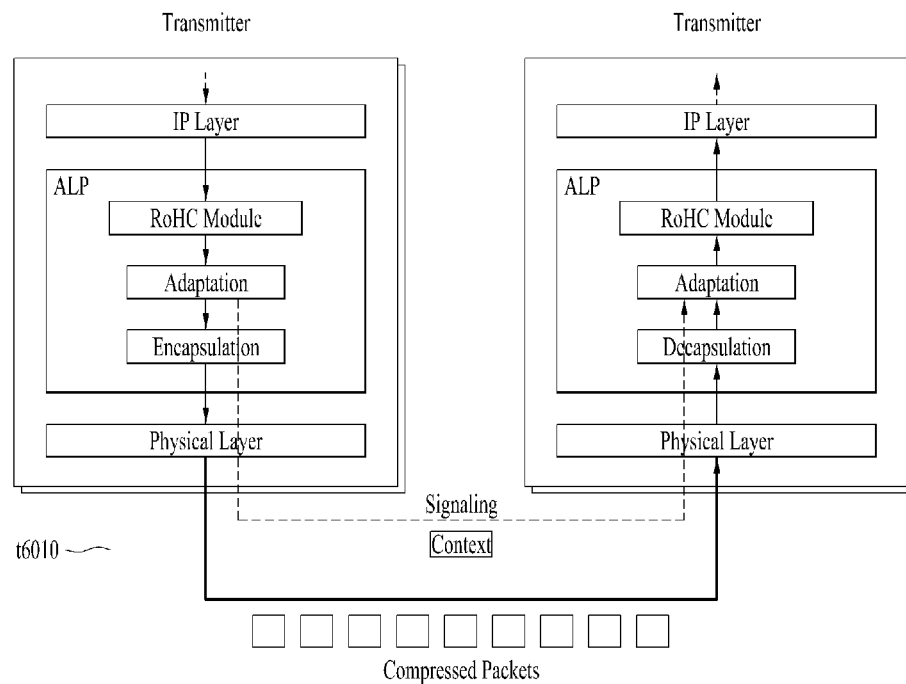
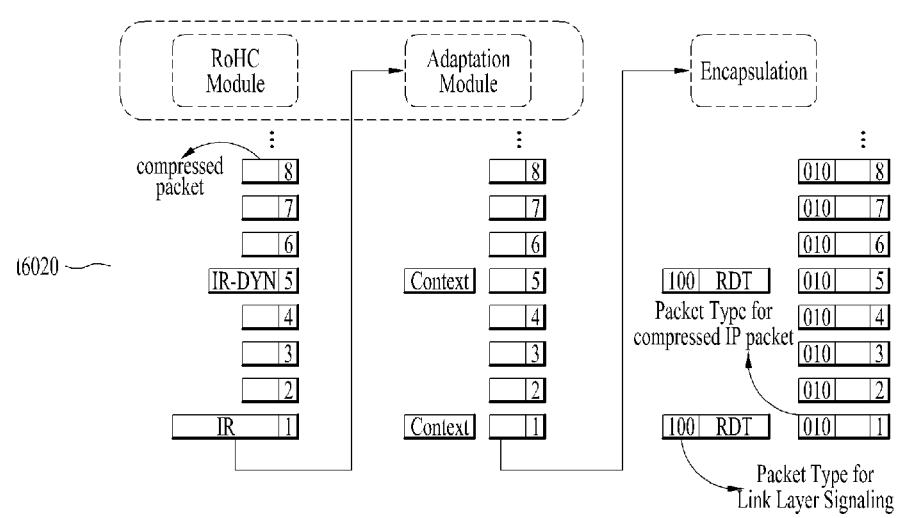

FIG. 7

| Syntax | Number of bits | Format |
|---|---|---|
| Link_Mapping_Table() { | | |
|    signaling_type | 8 | 0x01 |
|    PLP_ID | 6 | uimsbf |
|    reserved | 2 | "11" |
|    num_session | 8 | uimsbf |
|    for(i = 0 ; i < num_session ; i++) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if (SID_flag == "1") { | | |
|          SID | 8 | uimsbf |
|       } | | |
|       if (compressed_flag == '1') { | | |
|          context_id | 8 | uimsbf |
|       } | | |
|    } | | |
| } | | |

| Element Name | Cardinality | Data type | Included in Message Type |
|---|---|---|---|
| PDCDMessageVersion | 1 | Unsigned Integer | All |
| PDCDServiceName | 1 | String | All |
| PDCDMessageType | 1 | String | All |
| PDCDRespCode | 1 | Unsigned Integer | Response Message types |
| PDCDSubDuration | 1 | Unsigned Integer | All except cancel and cancelResponse | t53020

| Message Type Enumeration | Description | Allowed direction for this message type |
|---|---|---|
| Request Message Types | | |
| subscribe | Message to request a subscription | From CD to PD |
| cancel | Message to cancel a subscription | From CD to PD |
| renew | Message to renew a subscription | From CD to PD |
| Response Message Types | | |
| subscribeResponse | Response Message to the subscription request | From PD to CD |
| cancelResponse | Response Message to the cancel request | From PD to CD |
| renewResponse | Response Message to the renew request | From PD to CD | t53030

| Element Name | Cardinality | Data type |
|---|---|---|
| PDCDMessageVersion | 1 | Unsigned Integer |
| PDCDServiceName | 1 | String |
| PDCDMessageBodyData | 0..1 | Bytes |

FIG. 15

| Element Name | | | | Cardinality | Data type |
|---|---|---|---|---|---|
| MessageBody | | | | 1 | |
| | Service | | | 1...N | |
| | | id | | 1 | string |
| | | ServiceType | | 1 | interger |
| | | Name | | 1..N | string |
| | | Description | | 0..N | string |
| | | TargetUserProfile | | 0..N | |
| | Content | | | 0...N | |
| | | Programid | | 1 | string |
| | | Name | | 1..N | string |
| | | Description | | 0..N | string |
| | | TargetUserProfile | | 0..N | |
| | | CARatings | | 1 | string |
| | | Capabilities | | 1 | string |
| | | Component | | 1..N | |
| | | | @componetID | 1 | string |
| | | | @componentType | 1 | unsigned Byte |
| | | | @componentRole | 1 | string |
| | | | @componentName | 0..1 | string |
| | | | @componentLocation | 0..1 | string (URI) |
| | | FileContentItem | | 0..N | |
| | | | @FileContentItemLocation | 1 | string (URI) |
| | | | @FileContentItemName | 0..1 | string |
| | | | @FileContentItemID | 1 | string |
| | | | @FileContentItemType | 1 | string |
| | | | @FileContentItemEncoding | 1 | string |
| | | TimelineInfo | | | |
| | | | currentTime | 1 | data Time |
| | | Location | | | string (URI) |

FIG. 16

| Element Name | |
|---|---|
| ServiceName | |
| MessageBody | |
| | ServiceInfoRespType |
| | ESGInfo |
| | Components |
| | FileContentITem |
| | TimelineInfo |

FIG. 17

| Element Name | | Cardinality |
|---|---|---|
| MessageBody | | 1 |
| | ESGResponseType | 1 |
| | PDService | 0...N |
| | PDSchedule | 0...N |
| | PDContent | 0...N |

FIG. 18

| Element Name | | Cardinality | Data type |
|---|---|---|---|
| MessageBody | | 1 | |
| | MPState | 1 | string (enumerated) |
| | MPSpeed | 0..1 | fraction (string) |
| | MediaID | 0..1 | string |

FIG. 19

| Name | | | Type | Cardinality |
|---|---|---|---|---|
| EAMNotification | | | | |
| | EAM | | E1 | 1..N |
| | | EAMID | A | 1 |
| | | SentTimestamp | A | 1 |
| | | ExpiredTimestamp | A | 1 |
| | | Category | A | 0..1 |
| | | Urgency | A | 0..1 |
| | | Severity | A | 0..1 |
| | | Geo-loc | A | 0..1 |
| | | NewMsg | A | 0..1 |
| | | OneTimeMsg | A | 0..1 |
| | | EAMContent | E2 | 1 |
| | | ContentFormat | A | 1 |
| | | AddlEAMURL | E2 | 0..N |
| | | EAMContentAccessibilityURL | E2 | 1..N |
| | | AddlEAMPhone | E2 | 0..N |
| | | ContactEmail | E2 | 0..N |
| Message exchange protocol related elements: | | | | |
| | SubscriptionID | | | 1 |
| | PDDevID | | | 0..1 |
| | PDVersion | | | 0..1 |

FIG. 20 t59010

```
{
"$schema": "http://json-schema.org/draft-04/schema#",
"title": "Common subscription message structure schema",
"description": "All subscription related messages use this generic message structure.",
"ATSCCD_WSMessage": {
"type": "object",
"properties": {
"PDCDservicename": {
  "type": "string",
  "enum": ["atsc3.services.esg.1","atsc3.services.mps.1"]},
"oneOf":[{"$ref":"#/body/req"},{"$ref":"#/body/cancelreq"},{"$ref":"#/body/resp"},{"$ref":"#/body/cancelresp"}],
"body": {
  "req": {
    "properties": {
       "PDCDmessagetype": { "type": "string","enum": ["subscribe", "renew"]},
       "PDCDSubDuration": {"type": "object"}
    },
    "required": ["PDCDmessagetype","PDCDSubDuration"]},
  "cancelreq": {
    "properties": {
       "PDCDmessagetype": {"type": "string","enum": ["cancel"]}
    },
    "required": ["PDCDmessagetype"]},
  "resp": {
    "properties": {
       "PDCDmessagetype": {"type": "string","enum": ["subscribeResponse","renewResponse"]},
       "PDCDSubDuration": {"type": "object"},
       "PDCDRespCode": {"type": "integer"}
    },
    "required": ["PDCDmessagetype","PDCDSubDuration","PDCDRespCode"]},
  "cancelresp": {
    "properties": {
       "PDCDmessagetype": { "type": "string","enum": ["cancelResponse"]},
       "PDCDRespCode": {"type": "integer"}},
    "required": ["PDCDmessagetype","PDCDRespCode"]
  }
 }
},
"required": ["PDCDservicename"]
}
``` t59020

```
{
"$schema": "http://json-schema.org/draft-04/schema#",
"title": "Notification message structure schema",
"description": "All notification related messages use this message structure.",
"ATSCCDMessage": {
"type": "object",
"properties": {
     "PDCDservicename": {"type": "string","enum": ["atsc3.services.esg.1", "atsc3.services.mps.1", "atsc3.services.mt.1"]},
     "PDCDMessageBody": {"type": "object"}
   },
"required": ["PDCDservicename","PDCDMessageBody"]
}
```

FIG. 22

| Transport | E2 | NM/TM | 0..1 | |
|---|---|---|---|---|
| ipAddress | A | NM/TM | 1 | string |
| port | A | NM/TM | 1 | unsignedShort |
| srcIpAddress | A | NM/TM | 0..1 | string |
| transmissionSessionID | A | NM/TM | 1 | unsignedShort |
| hasFDT | A | NO/TM | 0..1 | boolean |

FIG. 23

| Element Name | | | | Cardinality | Data type | Description |
|---|---|---|---|---|---|---|
| MessageBody | | | | 1 | | |
|   Service | | | | 0...N | | Service fragment's root element. from ESG data model. |
|     id | | | | | | from ESG data model |
|     ServiceType | | | | | | from ESG data model |
|     Name | | | | | | from ESG data model |
|     Description | | | | | | from ESG data model |
|     TargetUserProfile | | | | | | from ESG data model |
|   Content | | | | 0...N | | Content fragment's root element. from ESG data model. |
|     id | | | | | | from ESG data model |
|     Name | | | | | | from ESG data model |
|     Description | | | | | | from ESG data model |
|     TargetUserProfile | | | | | | from ESG data model |
|     PrivateExt | | | | | | from ESG data model |
|       Component | | | | | | from ESG data model |
|         Location | | | | | anyURI | URL for access to the component. Added for the requirement |
|         Capabilities | | | | | | from ESG data model |
|     Location | | | | | anyURI | URL for access to the content. Added for the requirement |

FIG. 24

| Element Name | | Cardinality |
|---|---|---|
| MessageBody | | 1 |
| | ESGResponseType | 1 |
| | PDService | 0...N |
| | PDSchedule | 0...N |
| | PDContent | 0...N | t24010

| Query Parameter | Description |
|---|---|
| ESGRequesttype=0 | Request for ESG information for the current show only |
| ESGRequesttype=1 | Request for ESG information for the current service only |
| ESGRequesttype=2 | Request for all ESG information for all available services |
| ESGRequesttype=3 | Request for filtered ESG information for the current show only. |
| ESGRequesttype=4 | Request for filtered ESG information for the current service only. |
| ESGRequesttype=5 | Request for filtered ESG information for all available services. | t24020

FIG. 25

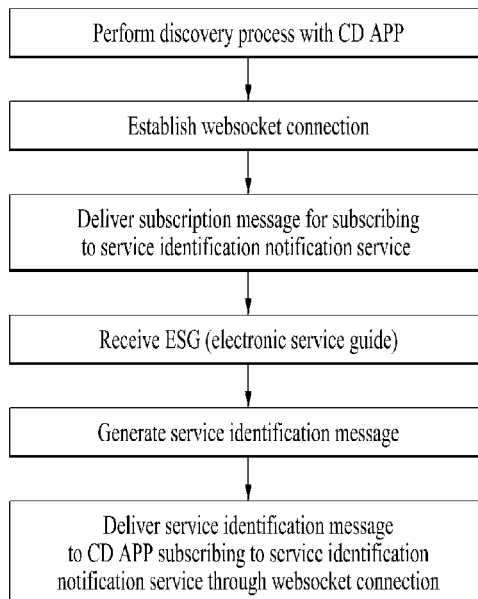

FIG. 27

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 28
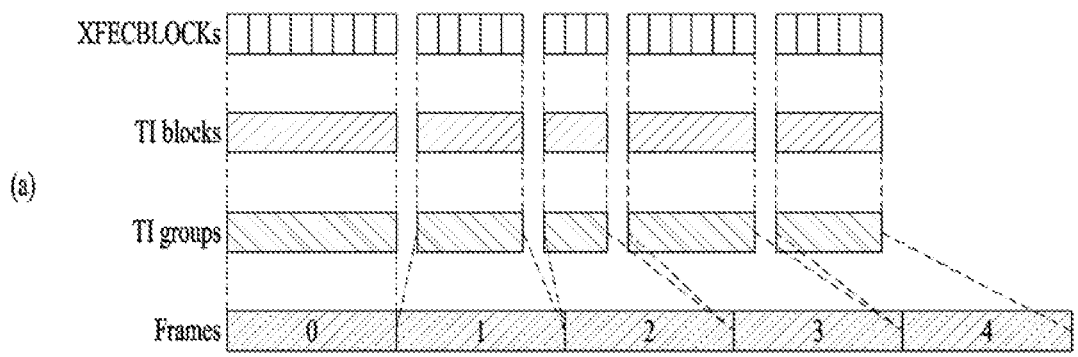
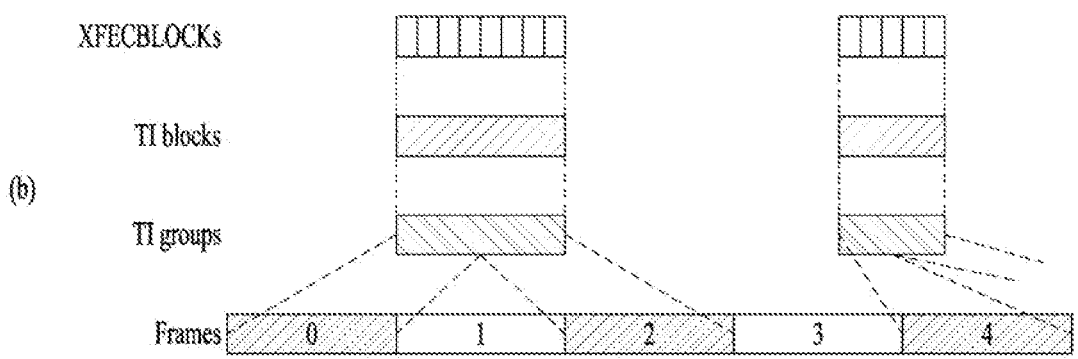
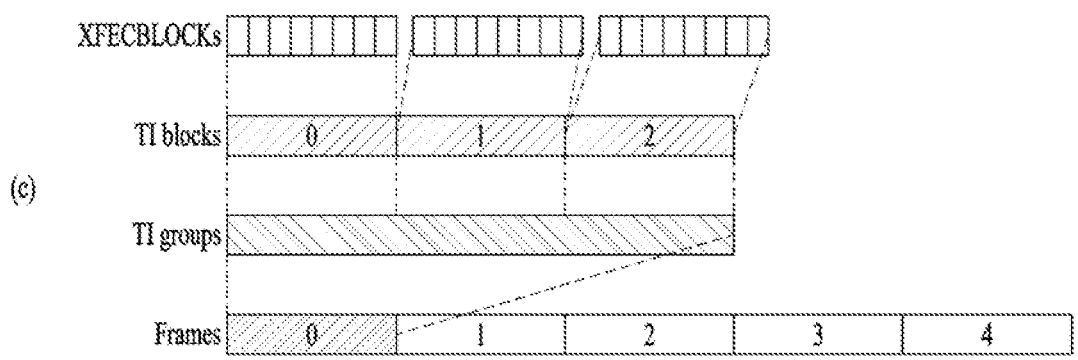

FIG. 29
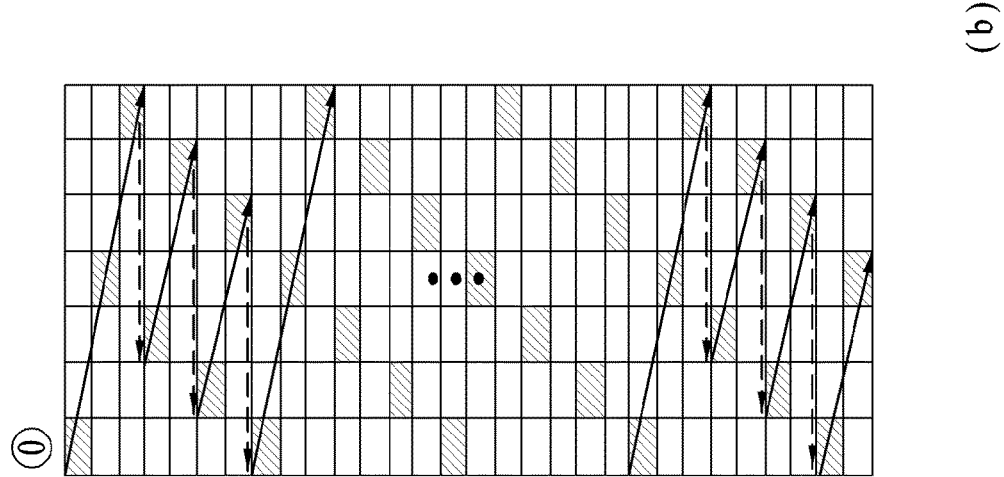
(b)
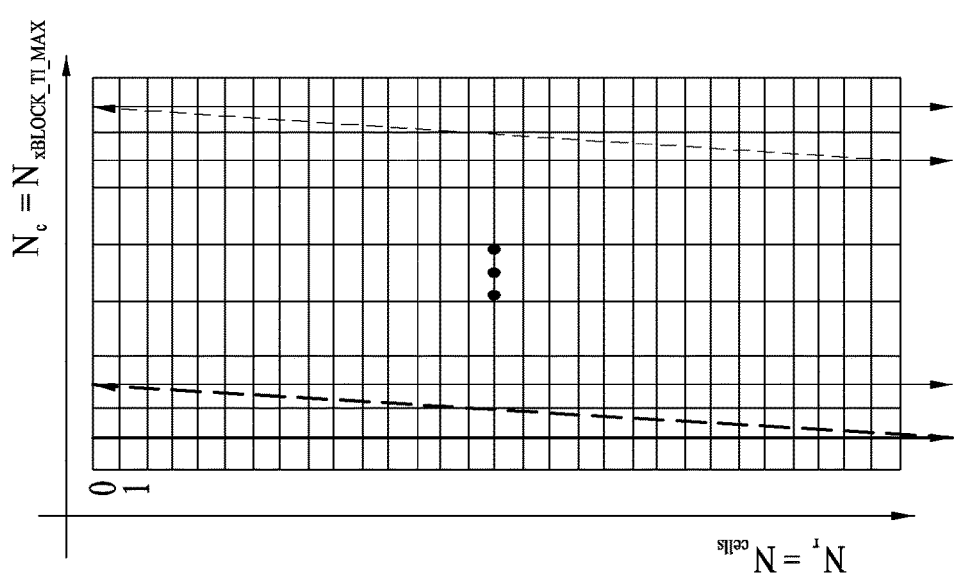
(a)

FIG. 32

BROADCASTING SIGNAL TRANSMITTING APPARATUS, BROADCASTING SIGNAL RECEIVING APPARATUS, BROADCASTING SIGNAL TRANSMITTING METHOD, AND BROADCASTING SIGNAL RECEIVING METHOD

CROSS-REFERENCE TO RELATED APPLICATIONS

This application is a Continuation of U.S. application Ser. No. 15/579,405 filed on Dec. 4, 2017, which is the National Phase of PCT International Application No. PCT/KR2016/007897, filed on Jul. 20, 2016, which claims priority under 35 U.S.C. 119(e) to U.S. Provisional Application No. 62/194,841, filed on Jul. 21, 2015, No. 62/197,588, filed on Jul. 28, 2015, No. 62/206,858, filed on Aug. 19, 2015, and No. 62/211,851, filed on Aug. 30, 2015, all of which are hereby expressly incorporated by reference into the present application.

BACKGROUND OF THE INVENTION

Field of the Invention

The present invention relates to an apparatus for transmitting a broadcast signal, an apparatus for receiving a broadcast signal and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

SUMMARY OF THE INVENTION

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

The present invention provides a system capable of effectively supporting future broadcast services in an environment supporting future hybrid broadcasting using terrestrial broadcast networks and the Internet and related signaling methods.

Advantageous Effects

The present invention proposes a method of efficiently providing a hybrid broadcast using a broadcast network and the Internet.

The present invention proposes a method of providing app-based enhancement based on an app for a basic broadcast service.

The present invention proposes a method of providing app-based enhancement in sync with a broadcast service.

The present invention proposes an architecture according to various protocols between a PD and a CD and a communication method between the PD and CD and between apps according to the architecture.

The present invention proposes an architecture and a signaling method for efficiently delivering information such as ESG or EAS from a PD to a CD.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through an MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 9 is a writing operation of a time interleaver according to an embodiment of the present invention;

FIG. 14 is a diagram showing a message structure for communication between a CD app and a PD according to an embodiment of the present invention:

FIG. 15 is a diagram showing a service/content identification message format according to an embodiment of the present invention;

FIG. 16 is a diagram showing a current service information message format according to an embodiment of the present invention;

FIG. 17 is a diagram showing an ESG message format according to an embodiment of the present invention:

FIG. 18 is a diagram showing a media playback state message format according to an embodiment of the present invention;

FIG. 19 is a diagram showing an EA message according to an embodiment of the present invention;

FIG. 20 is a diagram showing a subscription related message and a notification message of a Websocket protocol in JSON schema according to an embodiment of the present invention:

FIG. 22 is a diagram showing transport elated information included in an SGDD according to an embodiment of the present invention, FIG. 23 is a diagram showing a service/content identification message format according to another embodiment of the present invention, FIG. 24 is a diagram showing ESGRequesttype parameters which may be used for communication for ESG delivery according to another embodiment of the present invention:

FIG. 25 is a diagram showing a method of processing a broadcast service at a PD according to an embodiment of the present invention.

FIG. 27 illustrates preamble signaling data according to an embodiment of the present invention:

FIG. 28 illustrates a time interleaving according to an embodiment of the present invention:

FIG. 29 illustrates the basic operation of a twisted row-column block interleaver according to an embodiment of the present invention;

FIG. 32 illustrates interleaved XFECBLOCKs from each interleaving array according to an embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
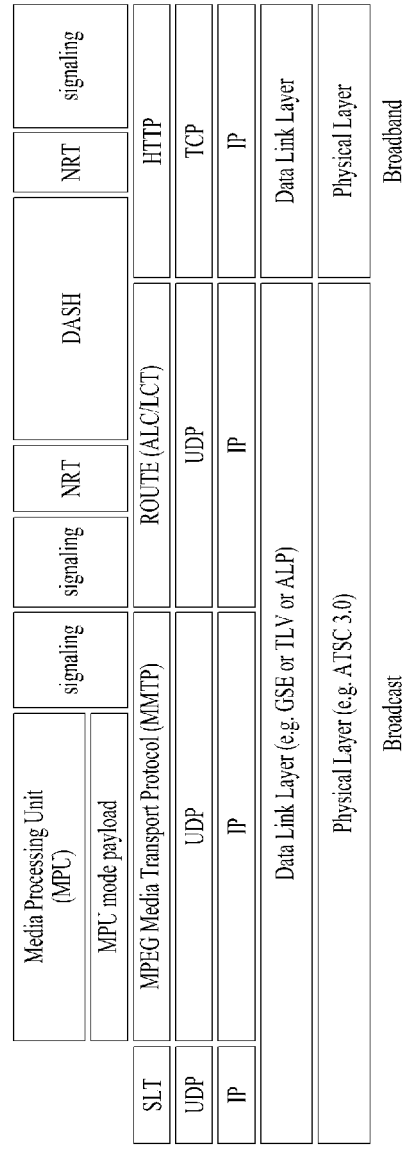
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
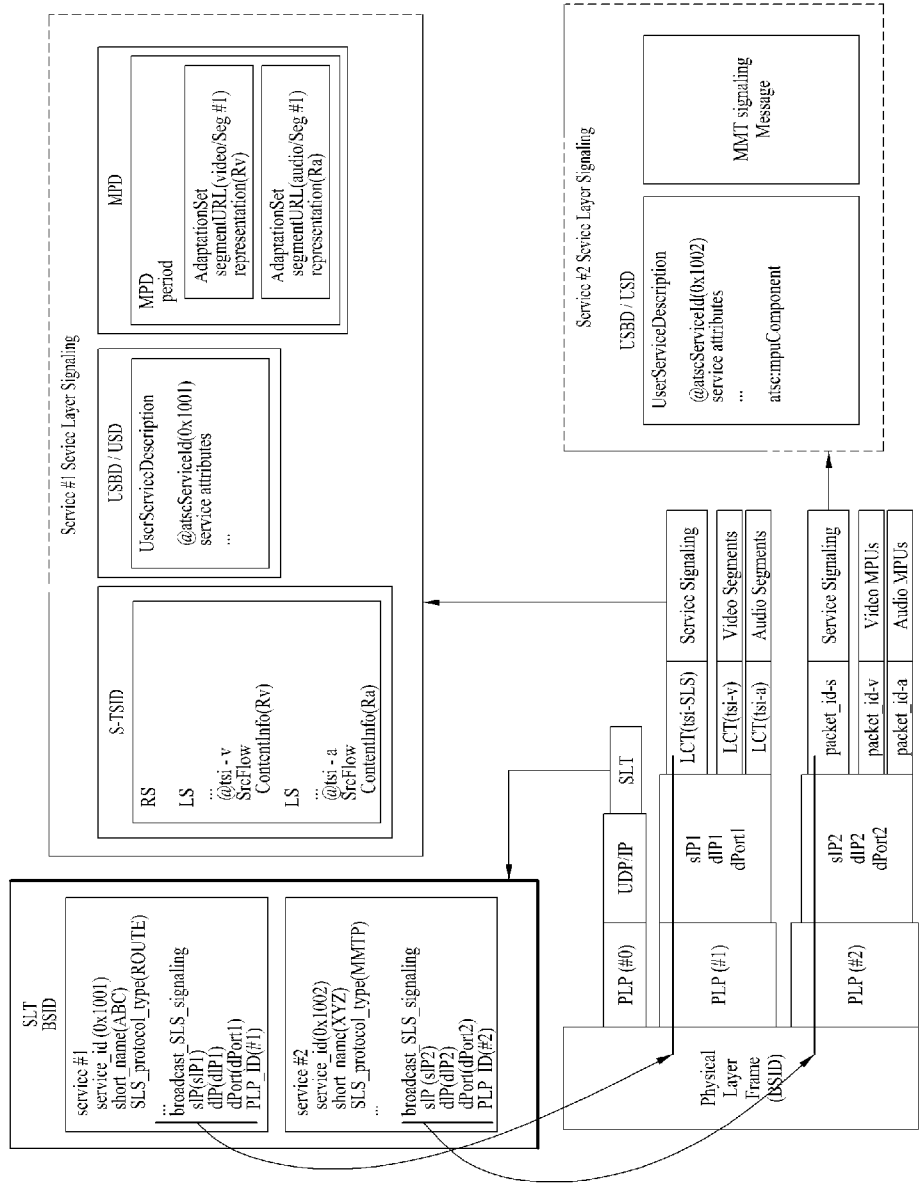
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID. MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment 3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating. SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @vslsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@2globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply deliver of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply deliver of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband.

In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @asTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquiring the signaling information, the receiver may combine the information to acquire mapping of service—IP information—context information—PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be predefined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L detail signaling information of a physical layer. The LLS flag may be a flag field indicating whether the LLS is transmitted through a corresponding PLP with respect to each PLP. Here, the L1 detail signaling information may be corresponding to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted together using a PLP loop.

The signaling_type field may indicate the type of signaling information delivered by the table. The value of signaling_type field for the LMT may be set to 0x01. The signaling_type field may signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband. URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
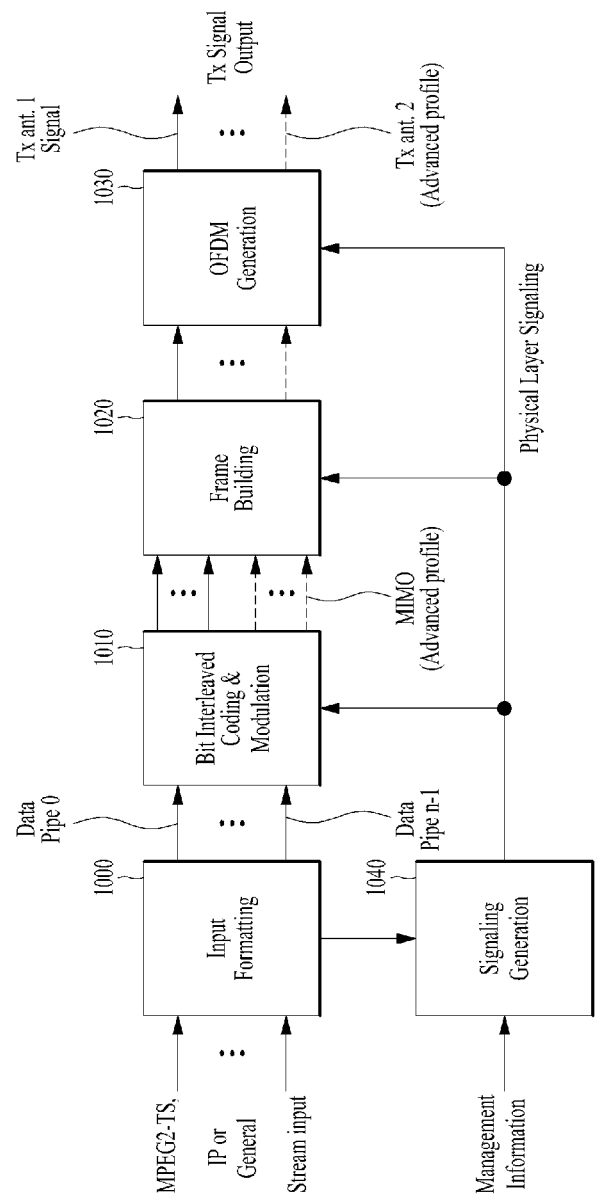
FIG. 8 is a diagram showing a structure of a broadcast signal transmission device of a next-generation broadcast service according to an embodiment of the present invention.

FIG. 8 is a diagram showing a structure of a broadcast signal transmission device of a next-generation broadcast service according to an embodiment of the present invention.

The broadcast signal transmission device of the next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present invention, input data may use IP stream/packet and MPEG2-TS as main input format and other stream types may be handled as a general stream.

The input format block 1000 may demultiplex each input stream using one or more data pipes to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

Since QoS is dependent upon the characteristics of a service provided by the broadcast signal transmission device of the next-generation broadcast service according to an embodiment of the present invention, data corresponding to each service needs to be processed via different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied is different from the processing block of the BICM to which MIMO is not applied in that a cell word demultiplexer and an MIMO encoding block are further included.

The data FEC encoder may perform FEC encoding on an input BBF to generate a FECBLOCK procedure using external coding (BCH) and internal coding (LDPC) The external coding (BCH) may be a selective coding method. The bit interleaver may interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point NUQ has an arbitrary type but QAM-16 and NUQ have a square shape. All of the NUQ and the NUC may be particularly defined with respect to each code rate and signaled by parameter DP_MOD of PLS2 data. The time interleaver may be operated at a data pipe level. A parameter of the time interleaving may be differently set with respect to each data pipe.

The time interleaver according to the present invention may be positioned between the BICM chain and the frame builder. In this case, the time interleaver according to the present invention may selectively use a convolution interleaver (C) and a block interleaver (BI) according to a physical layer pipe (PLP) mode or may use all. The PLP according to an embodiment of the present invention may be a physical path used using the same concept as the aforementioned DP and its term may be changed according to designer intention. The PLP mode according to an embodiment of the present invention may include a single PLP mode or a multiple PLP mode according to the number of PLPs processed by the broadcast signal transmitter or the broadcast signal transmission device. Time interleaving using different time interleaving methods according to a PLP mode may be referred to as hybrid time interleaving.

A hybrid time interleaver may include a block interleaver (BI) and a convolution interleaver (C). In the case of PLP_NUM=1, the BI may not be applied (BI off) and only the CI may be applied. In the case of PLP_NUM>1, both the BI and the CI may be applied (BI on). The structure and operation of the CI applied in the case of PLP_NUM>1 may be different from those of the CI applied in the case of PLP_NUM=1. The hybrid time interleaver may perform an operation corresponding to a reverse operation of the aforementioned hybrid time interleaver.

The cell word demultiplexer may be used to divide a single cell word stream into a dual cell word stream for MIMO processing. The MIMO encoding block may process output of the cell word demultiplexer using a MIMO encoding method. The MIMO encoding method according to the present invention may be defined as full-rate spatial multiplexing (FR-SM) for providing increase in capacity via relatively low increase in complexity at a receiver side. MIMO processing may be applied at a data pipe level. When a pair of constellation mapper outputs, NUQ $e_{1,i}$ and $e_{2,i}$ is input to a MIMO encoder, a pair of MIMO encoder outputs, g1,i and g2,i may be transmitted by the same carrier k and OFDM symbol l of each transmission antenna.

The frame building block 1020 may map a data cell of an input data pipe in one frame to an OFDM symbol and perform frequency interleaving for frequency domain diversity.

According to an embodiment of the present invention, a frame may be divided into a preamble, one or more frame signaling symbols (FSS), and a normal data symbol. The preamble may be a special symbol for providing a combination of basic transmission parameters for effective transmission and reception of a signal. The preamble may signal a basic transmission parameter and a transmission type of a frame. In particular, the preamble may indicate whether an emergency alert service (EAS) is currently provided in a current frame. The objective of the FSS may be to transmit PLS data. For rapid synchronization and channel estimation and rapid decoding of PLS data, the FSS may have a pipe pattern with higher density than a normal data symbol.

The frame building block may include a delay compensation block for adjusting timing between a data pipe and corresponding PLS data to ensure co-time between a data pipe and corresponding PLS data at a transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave a data cell received from the cell mapper to provide frequency diversity. The frequency interleaver may operate with respect to data corresponding to an OFDM symbol pair including two sequential OFDM symbols or data corresponding to one OFDM symbol using different interleaving seed orders in order to acquire maximum interleaving gain in a single frame.

The OFDM generation block 1030 may modulate an OFDM carrier by the cell generated by the frame building block, insert a pilot, and generate a time domain signal for transmission. The corresponding block may sequentially insert guard intervals and may apply PAPR reduction processing to generate a last RF signal.

The signaling generation block 1040 may generate physical layer signaling information used in an operation of each functional block. The signaling information according to an embodiment of the present invention may include PLS data. The PLS may provide an element for connecting a receiver to a physical layer data pipe. The PLS data may include PLS1 data and PLS2 data.

The PLS1 data may be a first combination of PLS data transmitted to FSS in a frame with fixed size, coding, and modulation for transmitting basic information on a system as well as a parameter required to data PLS2 data. The PLS data may provide a basic transmission parameter including a parameter required to receive and decode PLS2 data. The PLS2 data may be a second combination of PLP data transmitted to FSS for transmitting more detailed PLS data of a data pipe and a system. PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic data may be PLS2 data that is dynamically changed every frame.

The PLS2 data may include FIC FLAG information. A fast information channel (FIC) may be a dedicated channel for transmitting cross-layer information for enabling fast service acquisition and channel scanning. The FIC_FLAG information may indicate whether a fast information channel (FIC) is used in a current frame group via a 1-bit field. When a value of the corresponding field is set to 1, the FIC may be provided in the current frame. When a value of the corresponding field is set to 0, the FIC may not be transmitted in the current frame. The BICM block 1010 may include a BICM block for protecting PLS data. The BICM block for protecting the PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS 1 and 2 data using a BCH code shortened for PLS protection and inserting a zero bit after BCH encoding, a LDPC encoding block for performing encoding using an LDPC code, and an LDPC parity puncturing block. Only the PLS1 data may be permutated before an output bit of zero insertion is LDPC-encoded. The bit interleaver may interleave each of the shortened and punctured PLS 1 data and PLS2 data, and the constellation mapper may map the bit-interleaved PLS1 data and PLS2 data to constellation.

A broadcast signal reception device of a next-generation broadcast service according to an embodiment of the present invention may perform a reverse operation of the broadcast signal transmission deice of the next-generation broadcast service that has been described with reference to FIG. 8.

The broadcast signal reception device of a next-generation broadcast service according to an embodiment of the present invention may include a synchronization & demodulation module for performing demodulation corresponding to a reverse operation performed by the broadcast signal transmission device, a frame parsing module for parsing an input signal frame to extract data transmitted by a service selected by a user, a demapping & decoding module for converting an input signal into bit region data, deinterleaving bit region data as necessary, performing demapping on mapping applied for transmission efficiency, and correcting error that occurs in a transmission channel for decoding, an output processor for performing a reverse operation of various compression/signal processing procedures applied by the broadcast signal transmission device, and a signaling decoding module for acquiring and processing PLS information from the signal demodulated by the synchronization & demodulation module. The frame parsing module, the demapping & decoding module, and the output processor may perform the functions using the PLS data output from the signaling decoding module.

Hereinafter, the timer interleaver will be described. A time interleaving group according to an embodiment of the present invention may be directly mapped to one frame or may be spread over $P_I$ frames. In addition, each time interleaving group may be divided into one or more ($N_{TI}$) time interleaving blocks. Here, each time interleaving block may correspond to one use of a time interleaver memory. A time interleaving block in the time interleaving group may include different numbers of XFECBLOCK. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of the time interleaving memory, write a second XFECBLOCK in a next column, and write the remaining XFECBLOCKs in the time interleaving block in the same manner. In an interleaving array, a cell may be read in a diagonal direction to a last row from a first row (a leftmost column as a start column is read along a row in a right direction). In this case, to achieve single memory deinterleaving at a receiver side irrespective of the number of XFECBLOCK in the time interleaving block, the interleaving array for the twisted row-column block interleaver may insert a virtual XFECBLOCK into the time interleaving memory. In this case, to achieve single memory deinterleaving at a receiver side, the virtual XFECBLOCK needs to be inserted into another frontmost XFECBLOCK.

Figure 9:
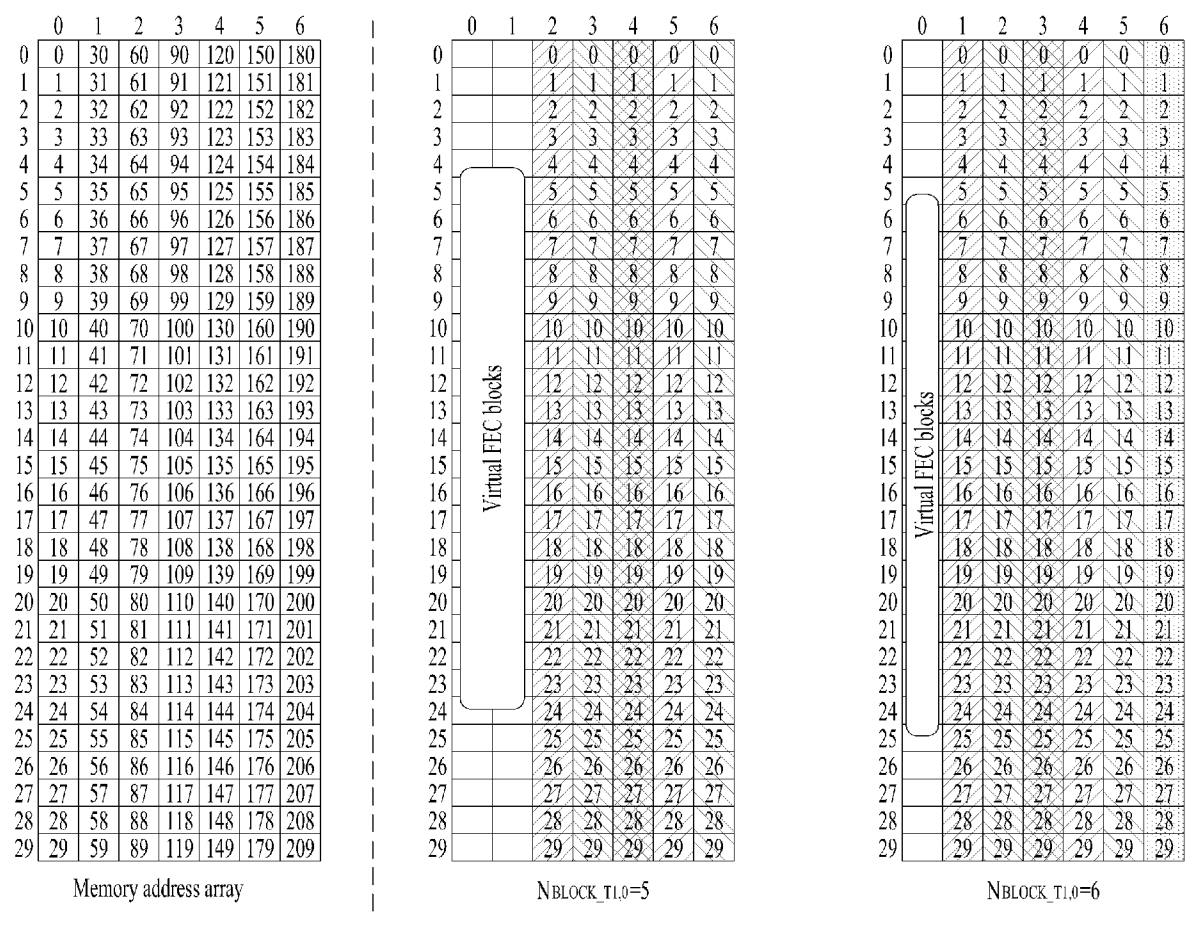

FIG. 9 is a writing operation of a time interleaver according to an embodiment of the present invention.

A block shown in a left portion of the drawing shows a TI memory address array and a block shown in aright portion of the drawing shows a writing operation when two or one virtual FEC blocks are inserted into a frontmost group of TI groups with respect to two consecutive TI groups.

The frequency interleaver according to an embodiment of the present invention may include an interleaving address generator for generating an interleaving address to be applied to data corresponding to a symbol pair.

Figure 10:
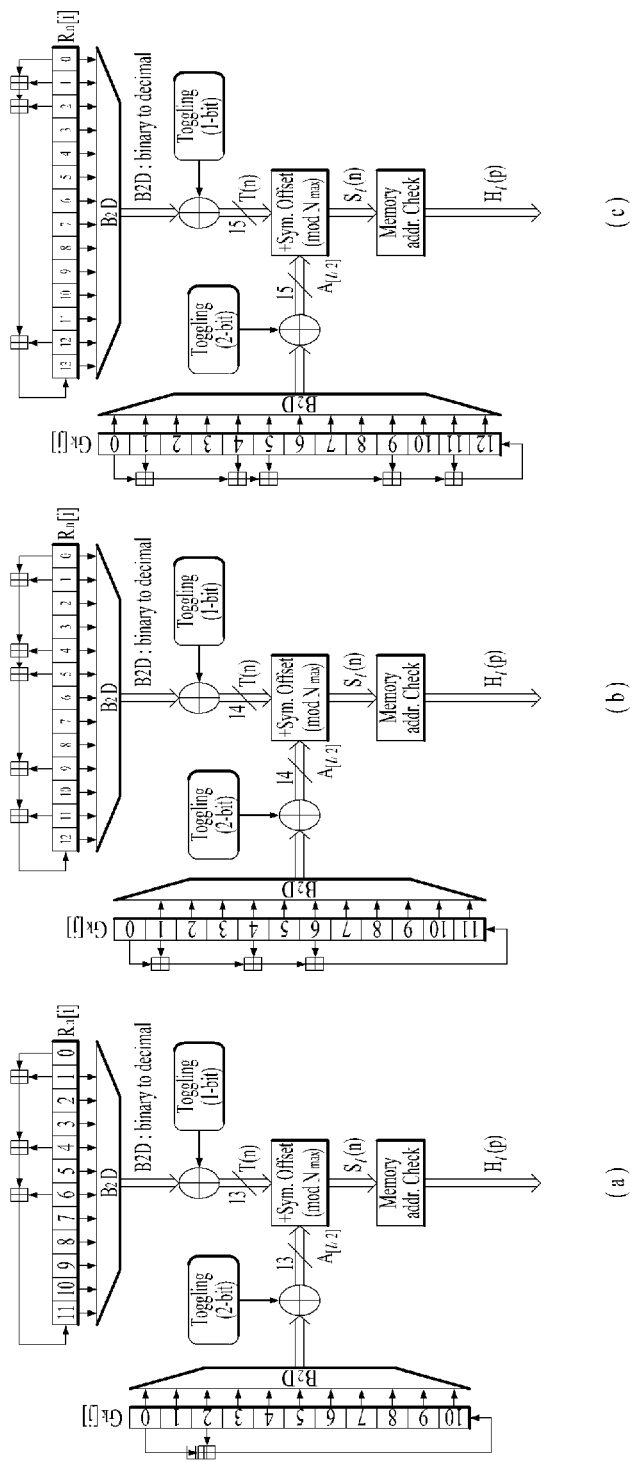
FIG. 10 is a block diagram of an interleaving address generator including a main-PRBS generator and a sub-PRBS generator according to each FFT mode, included in the frequency interleaver, according to an embodiment of the present invention.

FIG. 10 is a block diagram of an interleaving address generator including a main-PRBS generator and a sub-PRBS generator according to each FFT mode, included in the frequency interleaver, according to an embodiment of the present invention.

(a) is a block diagram of an interleaving address generator with respect to a 8K FFT mode. (b) is a block diagram of an interleaving address generator with respect to a 16K FFT mode, and (c) is a block diagram of an interleaving address generator with respect to a 32K FFT mode.

An interleaving procedure with respect to an OFDM symbol pair may use one interleaving sequence and will be described below First, an available data cell (output cell from a cell mapper) to be interleaved in one OFDM symbol $O_{m,l}$ may be defined as $O_{m,l}=[x_{m,l,0}, \ldots, x_{m,l,p}, \ldots, x_{m,l,Ndata-1}]$ with respect to l=0, ..., $N_{sym}-1$. In this case, $x_{m,l,p}$ may be a $p^{th}$ cell of a $l^{th}$ OFDM symbol in a $m^{th}$ frame and $N_{data}$ may be the number of data cells. In the case of a frame signaling symbol. $N_{data}=C_{FSS}$, in the case of normal data, $N_{data}=C_{data}$, and in the case of a frame edge symbol, $N_{data}=C_{FES}$. In addition, the interleaving data cell may be defined as $P_{m,l}=[v_{m,l,0}, \ldots, v_{m,l,Ndata-1}]$ with respect to l=0, ..., $N_{sym}-1$.

With respect to an OFDM symbol pair, an interleaved OFDM symbol pair may be given according to $v_{m,l,Hi(p)}=x_{m,l,p}$, p=0, ..., $N_{data}-1$ for a first OFDM symbol of each pair and given according to $v_{m,l,p}=x_{m,l,Hi(p)}$, p=0, ..., $N_{data}-1$ for a second OFDM symbol of each pair. In this case. $H_1(p)$ may be an interleaving address generated based on a cyclic shift value (symbol offset) of a PRBS generator and a sub-PRBS generator.

Figure 11:
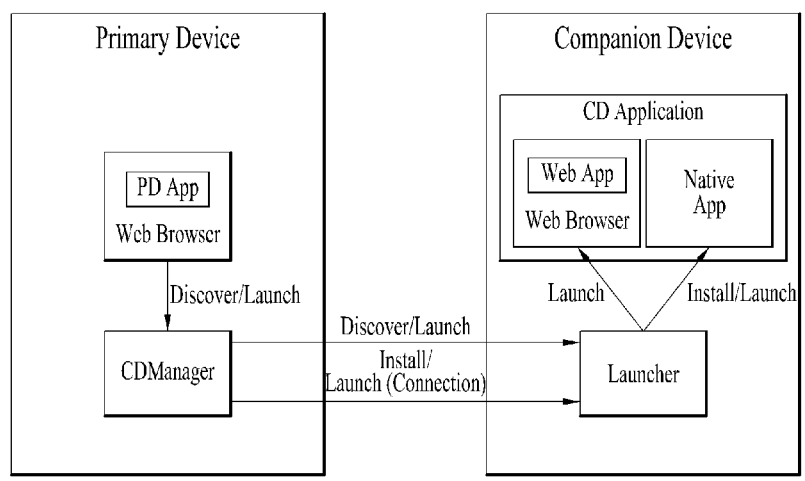
FIG. 11 is a diagram showing an architecture of a process of launching a CD application according to an embodiment of the present invention.

FIG. 11 is a diagram showing an architecture of a process of launching a CD application according to an embodiment of the present invention.

A PD refers to a primary receiver, which may be used to reproduce primary content. A CD may communicate with the PD to provide the same content as the content provided by the PD or supplementary content related thereto.

In some embodiments, the CD may include a laptop, a tablet, a smartphone, etc. In some embodiments, the CD may be used as a receiving device for displaying primary content. In some embodiments, the CD may access TV related content regardless of the PD.

A method of providing a broadcast service and content related thereto through communication between the PD and the CD may have various embodiments.

For example, assume that a user views the concert of a favorite rock and roll band thereof through a PD. Popup notification of a TV may indicate that an alternative camera view of the concert can be viewed through a CD. Then, the user may launch an application and the application may indicate that close-up of each musician may be provided. A viewer may enjoy broadcast content by viewing close-up of a guitarist among guitar solos. Main content of the TV and supplementary content of the CD may be synchronized and rendered.

In addition, for example, if a plurality of users views the TV (PD), each user may receive desired supplementary content thereof through the CD thereof. User #1 may find various audio tracks through the application of the CD thereof and select and receive a video description for a visually impaired person through the CD thereof. User #2 may find various closed captions through the application of the CD thereof and select and display an audio description for a hearing-impaired person on the CD thereof. User #3 may convert Spanish subtitles into English dubbing (audio) through the application of the CD thereof and receive English dubbing through headphones connected to the CD thereof.

In addition, for example, the user may receive popup notification indicating that the user may play along via a tablet while viewing a game show through a TV (PD). The user may launch the app of the tablet to play along with the game show in real time. Each quiz may be provided to the tablet of the user during the game show and the user may provide an answer to the quiz along with the other participants of the game show. The score of the user may be tracked by the application and compared with those of other viewers.

In addition, for example, when the user launches an on-demand app at the PD, this app may request information for personalization of the user and provide program recommendation. The PD app may propose a CD app for facilitating personalization information input and the user may input information through the CD app. The user may receive a recommended program through the on-demand app and select and view the program through the CD app. Alternatively, the recommended program may be provided by the CD.

In addition, for example, the user may receive content provided by the TV through the CD. In this case, even when the user moves around in the house far away from the TV, the user may continuously view the content through the CD. In addition, if an emergency alert (EA) is provided through a broadcast network, the user may receive an EA message or video related thereto through the CD even when the user is far from the TV.

In the shown architecture, the PD may include a web browser and/or a CD manager. The web browser may execute a PD application (app). The PD app may include HTML5 and/or web technologies related thereto. The CD manager may be located in the PD to discover CDs, in which launchers are being executed, and send app launch/app installation information to these launchers. The CD manager may also be referred to as a companion manager.

In the shown architecture, the CD may include a launcher. The launcher may communicate with the CD manager of the PD. To this end, the launcher may launch or install a CD app. The CD app may be a web app of a web browser or a native app.

In order to execute the CD app, a launchCSApp (integer enum_id, String payload, function onCSLaunch) method may be used. Here, a payload of a launchCSApp may specify an endpoint of a Websocket server. In some embodiments, this payload may also include information on a web server endpoint. This payload may have the following format in one embodiment.

```
{"launch" : [
{"launchURL" : "https://www.examples-r-us.com/quiz-fallback-application.
html? colour-blue&application_uri=ws://192.168.11: 992/hbbtv/",
"applicationType"  : "native" } ,
]}
```

First, the CD manager may request launching of the CD app, and this may be performed by sending an HTTP POST request to an application URL of the launcher of the CD. The application URL may be acquired in a device discover process. BODY data of the HTTP POST request may include the payload of the launchCSApp. This payload may indicate a CD app to be executed through a "launchURL" in the embodiment of the above-described payload. The type of the CD app to be launched may be indicated using an "applicationType" in the embodiment of the above-described payload.

Figure 12:
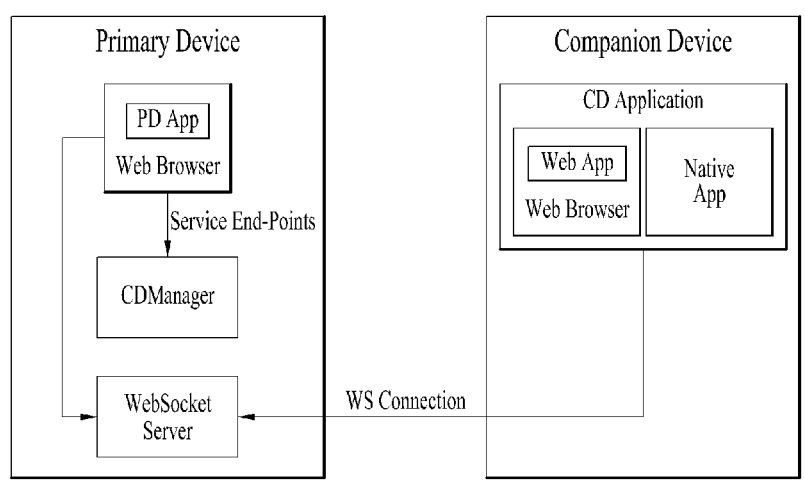
FIG. 12 is a diagram showing an architecture for communication between an app and an app according to an embodiment of the present invention.

FIG. 12 is a diagram showing an architecture for communication between an app and an app according to an embodiment of the present invention.

In the shown architecture, the PD may include a web browser, a CD manager and/or a Websocket server.

In the present embodiment, the web browser is equal to the above-described web browser. The CD manager may provide service endpoints for app-to-app communication. The Websocket server may be located in the PD to handle Websocket connection between a PD app and a CD app.

In the shown architecture, the CD may include a launcher. The launcher is not shown. The launcher may communicate with the CD manager of the PD. To this end, the launcher may launch or install a CD app. The CD app may be a web app of a web browser or a native app.

When the CD app is launched by the PD app, the location information of a service endpoint may be delivered to the CD app as one of the launch parameters of a launchCSApp method. The launchCSApp is a method of executing the app of the CD and a payload thereof may include the location information of the service endpoint. That is, in a process of launching the CD app, the information may be delivered to the CD. Here, the location information of the service endpoint may mean the URL of the endpoint of the Websocket server (or web server). Here, the delivered endpoint of the Websocket server may be a remote endpoint.

Figure 13:
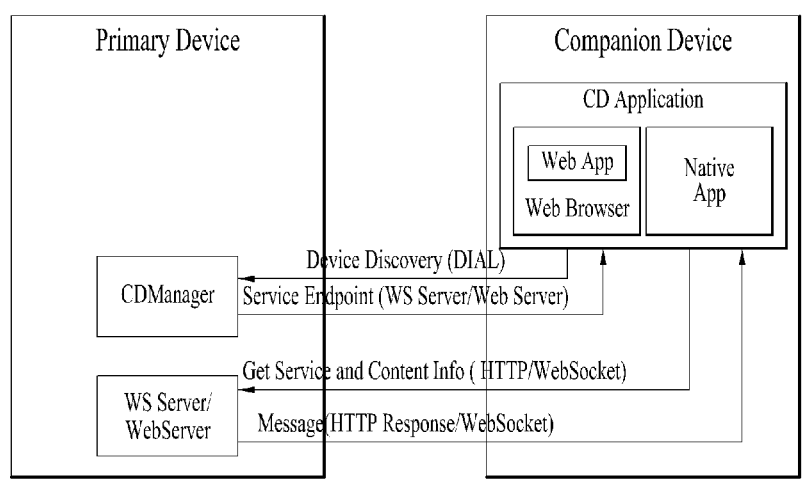
FIG. 13 is a diagram showing an architecture for performing communication from a CD app to a PD app according to an embodiment of the present invention.

FIG. 13 is a diagram showing an architecture for performing communication from a CD app to a PD app according to an embodiment of the present invention.

In the shown architecture, a PD may include a CD manager, a web server and/or a Websocket server. The CD manager may respond to a discovery request of a CD app and provide a service endpoint of a web server and/or a Websocket server.

In the shown architecture, the web server may be located in the PD to handle HTTP requests from the CD app and to respond to the requests using service and content information of the PD. The Websocket server may be located in the PD to handle Websocket connection from the CD app and to respond to this request using service and content information of the PD.

In the shown architecture, the CD app may discover the PD and acquire the service and content information from the PD through an HTTP and/or Websocket protocol.

The CD app may establish communication with servers for providing services in the PD. Here, the service may mean a function provided by the web server or the Websocket server, such as ESG delivery, EA delivery, service identification, or app-to-app communication. In order to establish communication, the CD app may first discover the PD. In this process, the CD app may acquire a remote endpoint of the web server and/or the Websocket server. The CD app may acquire service and content information through the Websocket server or through an HTTP GET request from the web server. If the Websocket server is used, the CD app may first establish Websocket connection and request service/content information through Websocket connection if the web server is used, the CD app may issue an HTTP GET request and receive an HTTP response, thereby acquiring information.

For reference, in the architecture according to each embodiment, elements included in the PD or the CD are exemplary and may be added/omitted/changed. In addition, in some embodiments, the PD or the CD may include all or some of the above-described elements.

A protocol for discovery will be described.

Both the PD and the CD app may transmit a multicast discovery message. This discovery message may search and/or advertise presence thereof.

On a home network, one or more PDs may be present. In addition, a CD app may receive a discovery message from a plurality of PDs. In this case, the CD app may ask a user about with which PD the CD app is interacted. Here, information in the discovery message may be displayed to the user to assist a user's decision. Even when a plurality of CDs is present on the home network, a reverse process may be performed.

Various mechanisms for discovery may be used. First, a scenario in which the CD app multicasts a search request message for PD discovery and the PD respond thereto will be described.

When the CD app is executed by the PD app, location related information of a service endpoint provided by the PD may be delivered as the parameter of the above-described launchURL. However, in communication from the CD app to the PD, the CD app needs to discover the endpoint location of the web server or the Websocket server of the PD. That is, in this case, endpoint information (a URL, etc.) needs to be separately acquired.

In this case, a web server endpoint URL and a Websocket server endpoint URL may be delivered to the CD app in the discovery process of the PD and the service endpoint of the PD. First, the CD app may initiate device discovery. This may be initiated by performing M-SEARCH using an SSDP protocol along with a search target (ST)header. For example, the M-SEARCH device discovery request may have the following format.
M-SEARCH * HTTP/1.1
HOST: 239.255.255.250:1900
MAN: "ssdp:discover"
MX: <seconds to delay response>
ST: urn:schemas-atsc.org.device: companionDevice: 1.0

When the above-described device discovery request is received, the PD may respond thereto through a LOCATION header and an ST along with HTTP/1.1 OK. For example, this response message may have the following format. LOCATION may include URL information for a description of a device.
HTTP/1.1 200 OK
CACHE-CONTROL: max-age=<seconds until advertisement expires>
EXT:
LOCATION: <URL for UPnP description for root device>
SERVER: <OS/version UPnP/1.0 product/version>
ST: urn: schemas-atsc.org.device: primaryDevice: 1.0
USN: <advertisement UUID>

When the above-described response message is received, the CD app may request a device description file. This request is an HTTP GET request and may be delivered to a LOCATION URL provided through the response message. This request may have the following format.
GET <path component of the LOCATION URL>HTTP/1.1
Origin: http://cs.services.broadcaster.com/
When the above-described HTTP GET request is received, the PD may respond thereto through an HTTP/1.1 OK header including an application URL. This application URL may be used as a web server endpoint of the PD This response may have the following format. In this example, the application URL may be represented by http://xx.xx.xx.xx:yyyy/applications.
HTTP/1.1 200 OK
CONTENT-LANGUAGE: <language used in description>
CONTENT-LENGTH: <bytes in body>
CONTENT-TYPE: text/xml; charset="utf-8"
Application-URL: http://xx.xx.xx.xx.yyyy/applications
Access-Control-Allow-Origin: *

In order to discover the PD service endpoint, an HTTP GET message may be delivered to xx.xx.xx.xx, port yyyy. This HTTP GET message may have the following format.
GET/applications/ATSC HTTP/1.1
Origin: http://cs.services.broadcaster.com/4
In response thereto, the following HTTP response may be returned. Here, <X_ATSC_App2AppURL> may be used as the Websocket endpoint of the PD.
Header:
HTTP/1.1 200 OK
Origin:
Body:
<?xml version="1.0" encoding="UTF8"?>
<servicexmlns="urn:dialmultiscreenorg:schemas:dial" dialVer="1.7">
<name>ATSC</name>
<options allowStop="false"/>
<state>running</state>
<additionalData>
<X_ATSC_App2AppURL>URL of App2App comm, endpoint </X_ATSC_App2AppURL>
<X_ATSC_UserAgent>Value of ATSC Terminal UA header</X_ATSC_UserAgent>
</additionalData>
</service>

A PD advertisement message will be described (multicast).

When the PD joins a network, the PD may multicast an SSDP message. This message may serve to advertise the PD. The PD may periodically transmit a multicast advertisement message. The multicast advertisement message may be transmitted to (239.255.255.250:1900), for example. This value may be changed according to embodiment. The advertisement message may include PD device type information, a PD identifier, valid duration information, additional information related to the PD, etc. The PD multicast advertisement message may have the following format.
NOTIFY * HTTP/1.1
HOST: 239.255.255.250:1900
CACHE-CONTROL: max-age=<advertisement validity duration in seconds>
LOCATION: <URL for primary device>
NT: urn:schemas-atsc.org:device:primaryDevice:1.0
NTS: ssdp:alive
SERVER: <Primary device ID/Version>
USN: uuid:<device uuid>urn.schemas-atsc.org:device: primaryDevice:1.0

In the above example, information indicating that the device is "urn:schemas-atsc.org:device:primaryDevice:1.0" may be signaled in an NT (Notification Type) header (PD device type information). In addition, information indicating that the identifier of the PD is "uuid:<device uuid>:urn: schemas-atsc.org:device:primaryDevice:1.0" may be signaled in a USN (Unique Service Name) header (PD identifier). In addition, a duration in which this advertisement message is valid may be signaled in a CACHE-CONTROL header (valid duration information) In addition, the additional information related to the PD may be signaled in a LOCATION header A CD advertisement message will be described (multicast). Similarly to the above-described PD, when the CD joins the network, an SSDP message may be multicast. This message may be periodically transmitted and may be transmitted to a predetermined address. The CD advertisement message may include CD device type information, a CD identifier, valid duration information and additional information related to the CD, like the above-described PD advertisement message. The CD multicast advertisement message may have the following format.

NOTIFY * HTTP/1.1
HOST: 239.255.255.250:1900
CACHE-CONTROL: max-age:=<advertisement validity duration in seconds>
LOCATION: <URL for companion device>
NT: urn:schemas-atsc.org:device:companionDevice:1.0
NTS ssdp:alive
SERVER: <Companion device ID/Version>
USN: uuid:<device uuid>:urn:schemas-atsc.org:device:companionDevice:1.0

The PD multicasting a search request message for discovering the CD will be described.

First, the PD may transmit an SSDP multicast search M-SEARCH request. This request may be transmitted to (239.255.255.250:1900), for example. This search request message may have the following format. Here, the ST header of the search request message may be set to the following CD device type. In addition, maximum response delay of the CD in seconds may be indicated in an MX header.

M-SEARCH * HTTP/1.1
HOST 239.255.255.250.1900
MAN: "ssdp:discover"
MX: <max response delay in seconds>
ST: urn:schemas-atsc.org:device:companionDevice:1.0

When the CD receives the above-described search request message from the PD, the CD may send a uncast search response message in response thereto. This response message should be transmitted in the maximum response delay indicated in the MX header of the search request message. This search response message may have the following format. Here a human-friendly CD device name may be provided in the format of <DevName> in the message body of the search response message.

HTTP/1.1 200 OK
CACHE-CONTROL: max-age=<advertisement validation duration in seconds>
DATE: <when response was generated>
LOCATION: <URL for device/service description for companion device>
SERVER <Companion device ID/Version>
ST: urn:schemas-atsc.org:device:companionDevice:1.0
USN: uuid:<device uuid>:urn:schemas-atsc.org:device:companionDevice:1.0

The payload of the above-described launchCSApp method may provide a remote endpoint of the Websocket server and/or a multicast address endpoint of a multicast group. The CD app may receive information from the PD app using these endpoints. In addition, app-to-app communication may be performed through the Websocket server.

FIG. 14 is a diagram showing a message structure for communication between a CD app and a PD according to an embodiment of the present invention.

Communication from the CD app to the PD may be performed in the following order. First, the CD app may discover the PD. In addition, the CD app may acquire web server and Websocket server endpoints of the PD. The CD app may request information through the HTTP or Websocket service endpoint. A request using HTTP, etc. may be transmitted to a web server endpoint URL, etc. The PD may deliver the information to the CD app through an HTTP response or a Websocket service endpoint, the HTTP response may be a response to the HTTP request.

There may be two service endpoints HTTP may use one service endpoint for asynchronous communication and the Websocket may use another endpoint for asynchronous communication. For example, communication for ESG delivery and/or service information, service, show and segment data delivery may be performed using HTTP. In addition, service and content identification, media playback state delivery, etc. may be performed through the Websocket. Communication for media timeline information delivery may be performed through HTTP and/or the Websocket.

First, a message structure for an HTTP request/response will be described.

The CD app may send an HTTP GET request to the PD At this time, the request URL may have the format of <ATSCCS_PDURL>/ServiceName?<param1=val1& ... >. An ATSCCS_PDURL is a URL acquired in a discovery process and may be a web server endpoint URL The ServiceName may indicate the name of the service related to information to be requested. For example, atsc3.csservice.esg.1 may be a service name for receiving an ESG (Electronic Service Guide), and atsc3.csservices.mt.1 may be a service name for receiving media timeline information. If the request URL includes a web server endpoint URL and a ServiceName for identifying an ESG service, this may mean that the CD app requests ESG information delivery from the web server endpoint.

When the PD receives an HTTP GET request, the PD may transmit an HTTP response to the CD app. This response may include a body including an ATSCCS_Message element, a ServiceName element and/or a MessageBody element along with an HTTP status code. The ServiceName element may include the name information of the requested service and the MessageBody element may include requested information.

A message structure for the Websocket will be described.

First, the PD may receive Websocket subscription from the CD app. When the received subscription is valid (does not expire or is not cancelled), the PD may transmit a Websocket message to the CD app. This Websocket message may be delivered through Websocket connection and should be delivered to the CD app whenever information of the message is updated. This Websocket message may be referred to as a notification message.

The shown embodiment (t53010) may be a subscription message transmitted by the CD app. The subscription related message between the PD and the CD may have the same format as the shown embodiment. The subscription message may include a PDCDMessageVersion element, a PDCDServiceName element, a PDCDMessageType element, a PDCDRespCode element and/or a PDCDSubDuration element.

The PDCDMessageVersion element may indicate the version of the subscription message. Alternatively, this element may indicate the version of the subscription message structure. Upper 6 bits may indicate a major version and lower 2 bits may indicate a minor version. The version of the subscription message structure may be 0×004, that is, version 1.0.

The PDCDServiceName element may indicate a service name related to the subscription message. This name may uniquely identify a service between the PD and the CD. For example, atsc3.services.esg.1 may indicate a service for ESG delivery, and atsc3.services.mps.1 may indicate a service for media playback state information delivery. A message having a PDCDServiceName element value which does not correspond to this service name may be ignored.

The PDCDMessageType element may identify the type of the subscription message. The type of the subscription message is shown in an embodiment (t3020). The subscription message type may include a request message type and a response message type. The request message type may correspond to a message transmitted from the CI) to the PD, and the response message type may correspond to a message transmitted from the PD to the CD. The request message type may include subscribe, cancel and/or renew types. The message types may be message types for request of subscription, cancellation of subscription and renewal of subscription. The response message type may include subscribeResponse, cancelResponse and/or renew Response types. The message types may be response messages to the messages of subscribe, cancel and renew types.

The PDCDRespCode element may include a success or failure code for the request of the message. This element may be included in the messages of the response message types among the above-described subscription related messages.

The PDCDSubDuration element may indicate a duration of subscription. If this is included in a message transmitted from the CD to the PD, this element may indicate the duration of the requested subscription. If this is included in a message transmitted from the PD to the CD, this element may indicate a duration in which subscription is active. This element may be included in all types of subscription related messages excluding a subscription cancellation message or a response message to subscription cancellation.

The shown embodiment (t53030) may indicate the above-described notification message or Websocket message, the notification message is transmitted from the PD to the CD, and may have the same structure as the shown embodiment. The notification message may include a PDCDMessageVersion element, a PDCDServiceName element and/or a PDCDMessageBody Data element.

The PDCDMessageVersion element may indicate the version of the notification message. Alternatively, this element may indicate the version of the notification message structure. Upper 6 bits may indicate a major version and lower 2 bits may indicate a minor version. The version of the notification message structure may be 0×004, that is, version 1.0.

The PDCDServiceName element may indicate a service name related to the notification message. This name may uniquely identify a service between the PD and the CD. For example, atsc3.services.esg.1 may indicate a service for ESG delivery, and atsc3services.mt.1 may indicate a service for media timeline information delivery. A message having a PDCDServiceName element value which does not correspond to this service name may be ignored.

The PDCDMessageBodyData element may include data elements specific to the message. The syntax of this element may follow an individual message structure related to each PD-CD service. Such an individual message may include a service/content identification message, a media timeline message, a media playback state message, etc. The individual message structure will be described below.

FIG. 15 is a diagram showing a service/content identification message format according to an embodiment of the present invention.

The present invention proposes a method of providing a variety of data from a broadcast receiver (TV receiver or PD) to a companion device (CD) in a next-generation hybrid broadcast environment using a terrestrial broadcast network and the Internet Here, the CD or a CD application launched in the CD may communicate with the PD.

In such data provision architecture, the PD and the CD may exchange various types of data. In provision of such data the services of the above-described Websocket endpoints, services provided by the HTTP service URL, etc may be used. Here, the service refers to a companion service between the PD and the CD and is different from a broadcast service.

For example, the PD may deliver information on a broadcast service (channel) or content (program of channel) which is currently being provided or will be provided by the PD to the CD. In addition, the PD may deliver an electronic service guide (ESG) or an emergency alert message (EAM) to the CD In some embodiments, the PD may deliver playback state information of a service which is being reproduced by the PD or timeline information of the PD to the CD.

Here, the EAM is an alert message indicating emergency or accidents and may be received by the PD and delivered to the CD. Here, the playback state information may mean information of a service, such as a broadcast service which is being provided by the PD, such as playback speed, fast forward or rewind. The timeline information may include media time information of a service, such as a broadcast service which is being provided by the PD, and/or a UTC absolute time pair.

The present invention proposes an architecture supporting communication between the PD and the CD based on Websocket and supporting communication between the PD and the CD based on an HTTP Request/Response. Here, a communication method according to Websocket or HTTP may be selected according to the properties of each companion service. The present invention can implement a flexible architecture configuration and secure efficiency in communication between the PD and the CD.

In one embodiment of the present invention. Websocket based communication is responsible for communication for service/content identification and communication for playback state delivery. At the same time. HTTP based communication performed by the web server is responsible for communication for ESG delivery and communication for service/show/segment related data delivery. Communication for media timeline information delivery may be performed by both Websocket and HTTP. In addition, in communication for service/content identification, service/content identification for a service which is currently being broadcast may be performed by HTTP based communication.

Communication for service/content identification will be described. Conventionally, a broadcast receiver directly provides a supplementary service of a broadcast service. In this case, when a user uses a supplementary service associated with a broadcast service including content identification or supplementary information confirmation while viewing a program, the broadcast program may be covered with related information. In the present invention, the related information may be displayed on the CD of the user, such that the user easily uses the supplementary service using the CD capable of being easily manipulated, without interrupting viewing of the broadcast program.

In addition, in the present invention, the present invention proposes a protocol and PD-CD architecture, a service/content identification message format delivered to the CD, etc. In addition, the present invention proposes a method of, at a CD or a CD app, accessing a service/content which is being provided or may be provided by the PD using a service/content identification message. To this end, the CD may acquire information on the broadcast service/content in advance, thereby sufficiently providing supplementary service. In addition, the present invention proposes a method of configuring a hierarchical location URL structure in a service/content identification message such that the CD efficiently acquires information on a service/content. In addition, the present invention proposes a method of using Websocket and HTTP to efficiently perform the above-described process. To this end, it is possible to provide a supplementary service, which can be conveniently used, without interrupting viewing of the service/content of the PD. In addition, the CD may acquire and reproduce the service/content or acquire and provide supplementary information related to the service/content or perform pre-processing for efficiently performing such a service.

In one embodiment of the present invention, the PD may deliver a service/content identification message to the CD or the CD app. First, in a discovery process, Websocket connection may be established. This process was described above. The Websocket server of the PD may receive a subscription message of a companion service for receiving a service/content identification message from the CD app. The CD app may subscribe to the companion service. This companion service may be renewed or subscription thereof may be cancelled. This companion service may be referred to as an ESG service.

When information related to the service/content is changed, the Websocket server may deliver a changed service/content identification message to the CD app. This service/content identification message may correspond to a notification message. This notification message may have a message body along with information indicating to which companion service the message is related. In this case, the message body may include information corresponding to a service/content identification message. The CD app may acquire this information to perform additionally necessary operation.

The CD app may receive a service/content identification message through Websocket connection and receive information on a service/content currently provided by the PD using HTTP. This process may be performed by an HTTP GET message and an HTTP Response thereto. The CD app may send an HTTP GET message to an HTTP service URL for identifying the web server of the PD and the service/content of the web server. The web server of the PD may send a response message to the CD app. Here, the response message may include information related to the service/content.

Delivery of the information related to the service/content by the Websocket may be delivery of the information related to the whole service/content which is being provided or will be provided by the PD, and may correspond to delivery of synthetic information in the format of notification. In contrast, delivery of the information related to the service/content by the HTTP may be delivery of information on the service/content which is currently being provided by the PD and may be performed by a request of the CD app.

Delivery by Websocket is delivery of synthetic full information and provides change of an ESG, that is, update of the ESG, to the CD without a request of the CD, thereby efficiently confirming the service/content. In this case, since a method such as a Websocket is further appropriate, the PD of the present invention supporting both the Websocket and the HTTP may use such information delivery using the Websocket. In addition, delivery by HTTP enables the CD to easily acquire related information by a request/response when the CD needs to acquire information on a service/content which is currently being reproduced by the PD. In this case, since a request/response method by HTTP GET is further appropriate, the PD of the present invention may use an HTTP protocol. The CD may receive a service/content identification message by the Websocket and further receive an HTTP response message to the current service/content.

In delivery by the Websocket, the service/content identification message will be described. The service/content identification message may include ESG information or information obtained by processing information acquired from the ESG. In addition, in some embodiments, the service/content identification message may borrow the information structure of the ESG.

One embodiment of the shown service/content identification message may include a Service element and/or Content element One or more Service elements may be included (1 . . . N), and 0 or more content elements may be included (0 . . . N).

The Service element may describe information on a broadcast service of the PD. Here, the information on the service may be obtained from an ESG data model. The Service element may include an id element, a ServiceType element, a Name element, a Description element and/or a TargetUserProfile element.

The id element may indicate the identifier of the service. The ServiceType element may indicate the service type of the service. The Name element may indicate the name of the service. The Description element may include a description of the service. The TargetUserProfile element may indicate a user profile targeted by the service.

The Content element may describe information on the content of the PD. Here, if a broadcast service is a channel, content may mean a program. The Content element may include a Programid element, a Name element, a Description element, a TargetUserProfile element, a CARatings element, a Capabilities element, a Component element, a FileContentItem element, a TimelineInfo element and/or a Location element.

The Programid element, the Name element, the Description element and the TargetUserProfile element may include the identifier, name, description and target user profile information of the content. The CARatings element may include Content Advisory information of the content. The Capabilities element may be capability information related to the content and may indicate capability information necessary to significantly reproduce the content.

The Component element may include information related to a component included in the content. Here, the Component element may include information related to continuous components of the content. Here, the continuous components may mean presentable components. In some embodiments, the continuous components may include audio/video/caption components. In some embodiments, the continuous components may include an app based enhancement component, an app component, etc. There may be a plurality of Component elements and each Component element may further include @componentType, @componentRole, @componentName and/or @componentLocation attributes.

The @componentType attribute may indicate the type of the component. For example, if the attribute has values of 0, 1, 2 and 3, the component may have an audio component, a video component, a closed caption component and an application component type. The remaining values may be reserved for future use.

The @componentRole attribute may indicate the role or type of the component. The @componentName attribute may indicate the name of the component. Here, this name may have a human readable format. The @componentLocation attribute may include URL information for accessing the component. Through this URL, the CD app may acquire the component.

The FileContentItem element may include information related to a file content item included in the content. Here, the FileContentItem element may include supplementary information (Adjunct Data) of the content. Here, the supplementary information may include a variety of information. In some embodiments, the supplementary information may include an app based enhancement component, an app component, etc. There may be a plurality of FileContentItem elements, which may be omitted. The FileContentItem element may include @FileContentItemLocation, @FileContentItemName, @FileContentItemID, @FileContentItemType and/or @FileContentItemEncoding attributes.

The @FileContentItemLocation attributes may include URL information for accessing the file content item. Through this URL, the CD app may acquire the file content item.

The @FileContentItemName attribute may indicate a human readable name of the file content item. The @FileContentItemID attribute may indicate the identifier of the file content item. The @FileContentItemType attribute may indicate the type of the file content item. The @FileContentItemEncoding attribute may indicate the encoding method of the file content item.

The TimelineInfo element may include timeline related information of the content. The timeline information may be delivered by HTTP GET or a separate Websocket service, or may be delivered in a state of being included in a service/content identification message. The TimelineInfo element may further include a currentTime element. The currentTime element may indicate the current time information of the content.

The Location element may include URL information for accessing the content. Through this URL, the CD app may acquire the content. This element may be URL information for accessing the whole content unlike the above-described URL information. In some embodiments, when a request for acquisition is sent using the URL information of this element, a query term may be further attached to acquire only a necessary component or file content item.

The service/content identification message may further include a Show element and a Segment element. For the Show element and the Segment element, elements/attributes included in the above-described Service element and Content element may be defined. In addition, the service/content identification message may further include information indicating which parts of the Service, Show, Segment and Content are currently reproduced by the PD based on the Service, Show. Segment and Content.

In some embodiments, the service/content identification message may further include logo, other ESG information, or features (size, codec, bit rate, aspect ratio, required/desired capability) of each service, content, etc. In addition, the service/content identification message may further include filtering criteria information capable of determining whether each service, content, etc. is suitable for a specific personalization criterion.

In some embodiments, the URL of the above-described location information may be the URL of the PD (or the server of the PD) for acquiring the information, the URL of the Internet for direct acquisition, or the URL of an arbitrary remote server. In some embodiments, the service/content identification message may further include information indicating whether subscription is possible in order to receive each service, content, etc. and whether one-off is possible.

In delivery by HTTP, the HTTP response message for delivery of the information related to the current service/content will be described.

As described above, the CD app may send an HTTP GET message to an HTTP based web server of the PD. This HTTP GET message may be requested using service URL information of the companion service. The HTTP GET message may include the service URL information and information for identifying the companion service (companion device for obtaining the current service/content related information) The HTTP GET message may further include a Query term. Through this Query term, which information is requested may be determined.

Through the HTTP GET message, the CD app may request information on the service/content which is currently being provided by the PD. Information on the service content capable of being requested may include ESG information of the current show, currently available component information, a currently available file, non-real-time data and/or current timeline location information.

The PD or the web server of the PD may deliver the requested information to the CD app through an HTTP response message. Here, the requested information may be included and, if the requested information is not present, the information may not be included. In addition, the HTTP response message may further include information indicating whether the information is included. Here, the information delivered according to the request may correspond to the information of the above-described service/content identification message. For example, the ESG information may correspond to id, Name. Description, CAratings elements among the above-described Service element and sub-elements thereof and the above-described Content element and sub-elements thereof. In addition, the component information may correspond to the above-described Component element and sub-elements thereof. The file or non-real-time data information may correspond to the above-described FileContentItem element and sub-elements thereof. In addition, the timeline location information may correspond to the above-described TimelineInfo element and sub-elements thereof.

FIG. 16 is a diagram showing a current service information message format according to an embodiment of the present invention.

The request for the current service information may be made according to HTTP. The CD may send an HTTP GET request to the PD to request information related to the current service. Here, the current service may mean a service or content which is currently being provided by the PD. A request URL may be <PD Host URL>/atsc3.csservices.esg.1?<Query>. The PD Host URL may be a web server endpoint URL, and atsc3.csservices.esg.1 may be the name of a service for delivery of the current service information The <Query> parameter may include various values to embody the HTTP request. The <Query> may include a ServiceInfoType parameter.

The ServiceInfoType parameter is a 32-bit field, which may indicate the type of the currently requested service information. Service information of the service/show/program which is currently being provided may have various types. For example, the current service information may include ESG information of the current show, available components of the current show, a current timeline location in the current show, files or non-real-time (NRT) content of the current show, etc. One or more of such information may be requested. Here, the show may mean a broadcast service or the content, program or scene of the broadcast service.

When a ServiceInfoType[n] is an n-th bit of the ServiceInfoType parameter, the value of each bit may be interpreted as follows. If the ServiceInfoType[0] is 1, this may indicate that the ESG information of the current show is requested. If the ServiceInfoType[1] is 1, this may indicate that the available components of the current show are requested. If the ServiceInfoType[2] is 1, this may indicate that available files or NRT content of the current show are requested. If the ServiceInfoType[3] is 1, this may indicate that the current timeline location of the current show is requested. For each bit, if the bit value is 0, this may indicate that the information is not requested. The ServiceInfoType[4] to ServiceInfoType[31] may be reserved for future use.

When a request for the current service information is received from the CD, the PD may send information on the requested type to the CD if possible. The PD may include the information on the requested type in an HTTP response message. In some embodiments, the PD may not include information, which is not requested by the CD, in the response message.

The response message format of the current service information is shown. In some embodiments, a body part of the HTTP response may be a JSON format and may follow a JSON schema. The HTTP response may include a ServiceName element and/or a MessageBody element.

The ServiceName element may indicate the name of the PD-CD service. In this case, since the service is for delivery of the current service information, this element may have a value of atsc3.csservices.esg.1.

The MessageBody element may include a response message body to the request for the current service information. The MessageBody element may include a ServiceInfoRespType element, an ESGInfo element, a Components element, a FileContentITem element and/or a TimelineInfo element.

The ServiceInfoRespType element may be a 32-bit field, which may indicate the type of the current service information returned as a response. A type such as ESG information may be indicated. When the ServiceInfoRespType[n] is an n-th bit of the ServiceInfoRespType element, the value of each bit may be interpreted as follows.

If the ServiceInfoRespType[0] is 1, this may indicate that the ESG information of the current show is included in this response message. If the ServiceInfoRespType[1] is 1, this may indicate that information related to the available components of the current show is included in this response message. If the ServiceInfoRespType[2] is 1, this may indicate that information related to the available files or NRT content of the current show is included in this response message. If the ServiceInfoRespType[3] is 1, this may indicate that information on the current timeline location of the current show is included in this response message. The ServiceInfoRespType[4] to the ServiceInfoRespType[31] may be reserved for future use.

The ESGInfo element may be equal to the Service element of the above-described service/content identification message and sub-elements thereof, id, Name, Description, CARatings sub-elements of Content element. This element may include requested ESG information.

The Components element may be equal to the Components element of the above-described service/content identification message and sub-elements thereof. This element may include requested component related information.

The FileContentITem element may be equal to the FileContentItem element of the above-described service/content identification message and sub-elements thereof. This element may include requested files or NRT content information.

The TimelineInfo element may be equal to the TimelineInfo element of the above-described service/content identification message and sub-elements thereof. This element may include requested timeline related information.

FIG. 17 is a diagram showing an ESG message format according to an embodiment of the present invention.

The request for the ESG information may be made according to HTTP The CD may send an HTTP GET request to the PD to request Full ESG or partial ESG information. The request URL may be equal to <PD Host URL>/atsc3.csservices.esg.2?<Query>. The PD Host URL may be a web server endpoint URL and atsc3.csservices.esg.2 may be the name of a service for delivery of the ESG information.

A <Query> parameter may include various values to embody an HTTP request. The <Query> may include an ESGRequesttype parameter.

If the value of the ESGRequesttype parameter is 0, this may mean that only ESG information of the current show is requested. The ESG information of the current show may include Service, Schedule and Content fragments of the ESG of the current show. Here, the show may mean broadcast content or a program.

If the value of the ESGRequesttype parameter is 1, this may mean that only ESG information of the current service is requested. The ESG information of the current service may include Service, Schedule and Content fragments of the ESG of a current virtual channel.

If the value of the ESGRequesttype parameter is 2, this may mean that all ESG information of all available services is requested. All ESG information may include Service. Schedule and Content fragments of the ESG of all virtual channels, through which the ESG may be transmitted, in some embodiments.

If a request for the ESG information is received from the CD, the PD may deliver the ESG information of the type to the CD. The PD may include the ESG information of the requested type in an HTTP response message. The response message format of the ESG information is shown. The HTTP response may include an ESGResponseType element, a PDService element, a PDSchedule element and/or a PDContent element.

The ESGResponseType element may indicate the type of the requested information returned as a response. If the value of this element is 0, this may indicate that only ESG information of the current show is included in the response message. If the value of this element is 1.this may indicate that only the ESG information of the current service is included in the response message. If the value of this element is 2, this may mean that the ESG information of all services is included in the response message. This information corresponds to the above-described ESGRequesttype parameter.

The PDService element may be a container containing a Service fragment of the ESG information and sub-elements thereof, for the ESG type indicated by the ESGResponseType element. The Service element of the ESG information may be included.

The PDSchedule element may be a container containing a Schedule fragment of the ESG information and sub-elements thereof, for the ESG type indicated by the ESGResponseType element. The Schedule element of the ESG information may be included.

The PDContent element may be a container containing the Content element of the ESG information and sub-elements thereof, for the ESG type indicated by the ESGResponseType element. The Content element of the ESG information may be included.

In some embodiments, the PD may not deliver the ESG according to the request. That is, if ESGRequesttype=0 or 1 or the PD cannot deliver the ESG, the MessageBody element of the response may not include sub-elements. If ESGRequesttype=2, the PD preferably delivers all available ESGs according to the request but, in some cases, may deliver only some ESGs along with an ESGResponseType having a lower value.

Request for and delivery of service/show/segment data will be described.

The request for the service/show/segment data may be made according to HTTP. To this end, information such as service components, file content items, etc. of a broadcast service or content may be delivered to the CD.

Continuous or presentable components may be accessed through the URL of the ComponentLocation element of the above-described service/content identification message. The CD app may make an HTTP GET request through this URL to acquire the component or component related information.

Adjunct data, that is, file or data components may be accessed through the URL of the FileContentItemLocation element of the above-described service/content identification message. The CD app may make an HTTP GET request using this URL to acquire files, data, etc.

In some embodiments, such a request may be made through the URL indicated by the Location element indicated by the above-described service/content identification message.

Request for and delivery of media timeline information will be described.

Request for the media timeline information may be made through HTTP and/or Websocket. The response message of the HTTP or the notification message of the Websocket may include absoluteTime information and/or mediaTime information. The absoluteTime information may mean current UTC time information, and the mediaTime information may indicate the media time at the current UTC time. By sending such two pieces of information, the CD may acquire the media timeline related information.

FIG. 18 is a diagram showing a media playback state message format according to an embodiment of the present invention.

The media playback state related information may be delivered to the CD through Websocket connection. The shown message body format may be included in the message body part of the notification message of the Websocket to be delivered from the PD to the CD.

The media playback state related information may include an MPState element, an MPSpeed element and/or a MediaID element.

The MPState element may indicate the current playback state of the media. Here, the media may be a media identified by the below-described MediaID element or a media which is currently being provided by the PD. The value of this element may be one of "PLAYING", "PAUSED", "STOPPED", "BUFFERING" and "UNKNOWN" The "STOPPED" state may mean the end of the media stream.

The MPSpeed element may indicate the current playback speed of the media relative to a normal speed. If the value of this element is a positive value, this may mean forward playback. Forward playback may mean that a media timeline position increases as a wall-clock time increases. If the value of this element is a negative value, this may mean backward playback. Backward playback may mean that a media timeline position decreases as a wall-clock time decreases.

If the value of this element is 1, this may mean that the media is played back forward at a normal speed. In the case of forward playback at the normal speed, the media timeline may increase by the same amount as increase in the wall-clock time. If the value of this element is −1, this may mean that the media is played back backward at the normal speed. In the case of backward playback at the normal speed, the media timeline may decrease by the same amount as decrease in the wall-clock time.

If the value of this element is X and X is not 0 or 1, this may mean that the media is played back at a speed which is X times the normal speed. In this case, the media timeline may increase by X times the wall-clock time (if X is a positive value) or decrease by X times the wall-clock time (if X is a negative value).

If the value of this element is 0 and the current MPState is "PLAYING", this may mean an UNKNOWN playback speed. If the MPState is any state excluding "PLAYING", the value of this element may be 0.

In addition, if the MPState is "PLAYING" and this element is not present, this element may be inferred to have a value of 1. In addition, if the MPState is any state excluding "PLAYING" and this element is not present, this element is inferred to have a value of 0. This element may be included in the response message if the PD supports a PVR function.

The MediaID element is the identifier of the media, which may identify a target media, the media playback state information of which is requested. This identifier may uniquely identify the media in the PD, from which the media playback state information is requested. If this element has a value of "CURRENT", this may mean that information on main media currently played back by the PD is requested.

In some embodiments, one or more {MPState, MPSpeed, MediaID} sets may be included in the MessageBody.

FIG. 19 is a diagram showing an EA message according to an embodiment of the present invention.

An EAM (EA Message) may be received by the PD and may be rendered by a control function of the PD. The EAM may be received through a broadcast network or broadband. The received EAM may be delivered to the CD through a local area network. This delivery process may include a process of, at the PD app of the PD, launching the CD app at the CD and delivering an EAM to the CD app(s) for rendering.

The EAM may be delivered to the CD in a Websocket and/or multicast manner. In a scenario for EAM delivery, the PD may include a PD app, a CD manager, a Websocket server and/or a multicast sender.

The PD app may be responsible for delivering the EAM to available CD(s) in a local area network. The CD manager is equal to the above-described CD manager and may be responsible for discovering a CD in which a launcher is being executed and delivering execution information for launching an EA CD app (emergency CD application) to the launcher.

The Websocket server may be equal to the above-described Websocket server and handle Websocket communication (connection) between the PD app and the launched EA CD app. The multicast sender may be responsible for transmitting a multicast message from the PD app within the PD.

In this scenario, the CD may include a launcher and/or an EA CD app. The launcher is equal to the above-described launcher and may be responsible for communicating with the CD manager of the PD and launching the EA CD app of the CD. The EA CD app may be a CD app for receiving the EAM from the PD and displaying the EAM to the user.

While executing the internal control function, the PD may receive the EAM In response thereto, the internal control function may launch an embedded PD app. The PD app may render this EA and may manage the process of rendering the EA at the CD(s) in the local network.

First, the process of delivering the EAM from the PD app to the EA CD app through the Websocket will be described.

The PD app may find all CDs available in the launcher through a discoverCSLauncher( ) method, in order to launch the CD app to receive and render the EAM. If a CD having a launcher is not found, the PD app may end. If a CD having a launcher is found, the PD app may find a local endpoint of a PD Websocket communication service through a getApp2AppLocalBaseURL( ) method. In addition, the PD app may find a remote endpoint of a PD Websocket communication service through a getApp2AppRemoteBaseURL( ) method. Here, the endpoint of the Websocket communication service may mean endpoints of the Websocket server.

For each found CD, the PD app may launch the EA CD app through a launchCSApp( ) method. Before launching, the EA CD app to be launched may be identified through a LaunchURL. In addition, the remote endpoint of the Websocket communication service may also be identified. Each launched EA CD app may access the URL of the remote endpoint of the PD Websocket communication service. The EA CD app to be launched may be identified and launched through a LaunchURL. In the process of launching the EA CD app, remote endpoint information may be delivered to the CD.

The PD app may be attached to the local endpoint of the Websocket communication service, and the EA CD app may be attached to the remote endpoint. To this end. Websocket connection between the PD app and the EA app may be established. If connection is established, the PD app may deliver the received EAM to the EA CD app. The EA CD app may process and render the EAM.

The process of delivering the EAM from the PD app to the EA CD app in a multicast manner will be described.

The PD app may find all CDs available in the launcher through a discoverCSLauncher( ) method. For each found CD, the PD app may execute the EA CD app through a launchCSApp( ) method. In this process, EA CD app related information identified by LaunchURL and/or multicast information may be delivered to the CD. The multicast information may include a multicast group address and/or multicast port information According to context, the multicast group address and the multicast port information may be collectively referred to as a multicast group address. Each launched EA CD app may access the multicast group address.

The launched EA CD app may check whether the EA CD app has multicast group information for EA If the EA CD app does not have such information, the EA CD app may send a request to a known endpoint of the PD. The PD may send the above-described multicast information as a response. If the EA CD app has multicast information, the EA CD app may join the multicast group for EA. In this process, the multicast group address may be used.

After the EA CD app is launched, the PD app may transmit the EAM to the multicast group address using the multicast sender. To this end, the EAM may be delivered to the EA CD app. The EA CD app may receive the EAM and process and render the EAM.

If the EAM rendering time expires, the PD app may send a termination request to the multicast group address to terminate all EA CD apps. Thereafter, the PD app may end.

The format of the EAM will be described. One embodiment of the EAM is shown.

As described above, as soon as the EAM is received by the PD, the EAM may be delivered to the CD. In this process, a subscription ID, initial content of the EAM, characteristic information of the initial content of the EAM, additional content, etc. may be delivered to the CD along with the EAM. Here, the characteristics of the initial content of the EAM may mean a new message, a continuous message and/or a one-time message or may mean whether a rich media is included in addition to text.

In the shown embodiment, a plurality of EAMs may be delivered to the CD at a time in some embodiments. That is, the EAMNotification element may include a plurality of EAM elements.

The EAM element may include an EAMID attribute, a SentTimestamp attribute, an ExpiredTimestamp attribute, a Category attribute, an Urgency attribute, a Severity attribute, a Geo-loc attribute, a NewMsg attribute, a OneTimeMsg attribute, an EAMContent element, an AddlEAMURL element, an EAMContentAccessibilityURL element, an AddlEAMPhone element and/or a ContactEmail element.

The EAMID attribute may indicate the identifier of the EA message (EAM). This identifier may uniquely identify the EA message.

The SentTimestamp attribute may indicate the date and/or time when the EA message is generated. For example, the SentTimestamp attribute may indicate a first moment when the EA message becomes valid.

The ExpiredTimestamp attribute may indicate a last moment (date and/or time) when the EA message becomes valid.

The Category attribute may indicate the category of the EA message. For example, the Category attribute may indicate at least one of Geo. Met, Safety. Rescue, Fire, Health, Env, Transport, Infra, and/or CBRNE.

The Urgency attribute may indicate urgency of the EA message. For example, the Urgency attribute may indicate at least one of Immediate. Expected. Future. and/or Past.

The Severity attribute may indicate the severity of the EA message. For example, the Severity attribute may include at least one of Extreme. Severe. Moderate, and/or Minor.

The Geo-loc attribute may indicate a geographical location, to which the EA message is applicable.

The NewMsg attribute may indicate whether the EA message is a new message. If the value of the NewMsg attribute is "true", this EA message may be a new message. If the value of the NewMsg attribute is "false", this EA message may be repetition of a previous EA message.

The OneTimeMsg attribute may indicate whether the EA message is transmitted only once. If the value of the OneTimeMsg attribute is "true", this EA message may be transmitted only once and may not be repeatedly transmitted. If the value of the OneTimeMsg attribute is "false", this EA message may be repeated at least once.

The EAMContent element may include the message content of the EA message. The EAMContent element may further include a ContentFormat attribute. The ContentFormat attribute may indicate the type of the content of the EA message included in the EAMContent element.

The AddlEAMURL element may indicate a URL for providing additional information of the EA message. This URL may provide more information than information included in the EAMContent element. To this end, additional content, etc. for emergency alert may be acquired.

The EAMContentAccessibility, URL element may indicate a URL for providing initial emergency alert (EA) message content for accessibility. This may be a URL for acquiring information for fast alert in addition to main content for EA. In some embodiments, this element may indicate a URL for providing the EA and a secondary audio stream for facilitating information provision according to EA. This may be performed according to a requested method based on the FCC rule.

The AddlEAMPhone element may indicate a phone number for obtaining more information of the EA message. The ContactEmail element may indicate an email address for providing more information of the EA message.

In some embodiments, the EAMNotification element may further include a SubscriptionID element, a PDDevID element and/or a PDVersion element.

The SubscriptionID element may indicate a subscription identifier for subscription of the EA message. The SubscriptionID element may be used to uniquely identify subscription from the CD to the PD. The PDDevID element may be the device identifier of the PD. The PDVersion element may indicate the version information of the PD.

The EAM may follow an XML format or a JSON format. The EAM may be changed to an XML format, and the changed XML schema may be defined according to the standard XML convention based on the above-described elements/attributes.

In some embodiments, the PD app and the CD app may operate in tandem. In this case, communication between the PD app and the CD app may be performed, and a protocol such as Websocket may be used therein. A discovery process may use DIAL SSDP, UPnP, etc in addition to the above-described method.

FIG. 20 is a diagram showing a subscription related message and a notification message of a Websocket protocol in JSON schema according to an embodiment of the present invention.

In PD-CD communication according to the Websocket protocol, a subscription related message from the PD to the CD or from the CD to the PD is shown (t59010). The shown format may be represented in JSON format or XML format in some embodiments.

In addition, in PD-CD communication according to the Websocket protocol, a notification message from the PD to the CD is shown (t59020) The shown format may be presented in JSON format or XML format in some embodiments.

Figure 21:
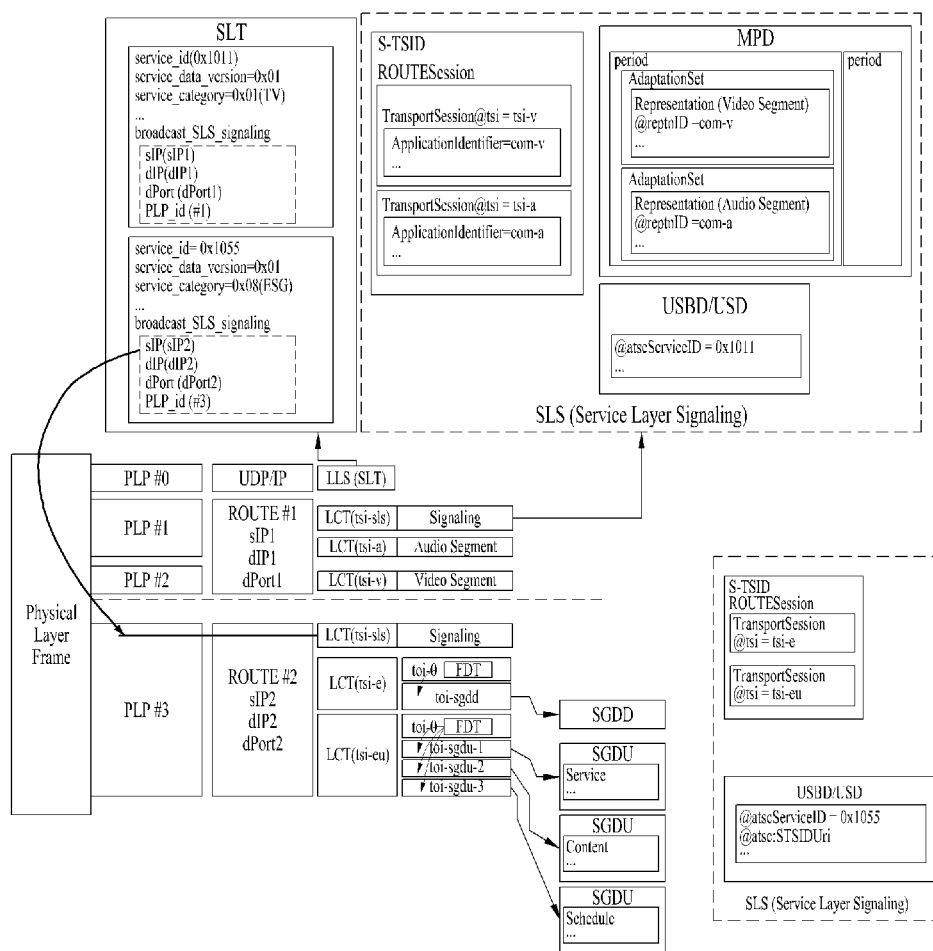
FIG. 21 is a diagram showing delivery of electronic service guide (ESG) information through a broadcast network according to an embodiment of the present invention.

FIG. 21 is a diagram showing delivery of electronic service guide (ESG) information through a broadcast network according to an embodiment of the present invention.

The ESG may provide a service guide for a broadcast service and broadcast content of the service. ESG information may be divided into various fragments and such ESG information may be encapsulated and delivered to a broadcast receiver, etc. The ESG may include a service fragment, a schedule fragment, a content fragment, etc.

The service fragment may describe content items included in one broadcast service at an aggregate level, that is, the service fragment may provide service guide information of the broadcast service. Here, the content item may mean a component, data, signaling information, etc included in the service.

The service fragment may include ID information of the service, type information of the service, service name information, description information of the service, audio language or text language information of the service, advisory rating information of the service, genre information, broadcast area information, etc. In addition, the service fragment may include ID information of the service fragment, version information and valid period information of the service fragment. In addition, the service fragment may include an extension element including a major/minor channel number, icon information, etc. of the service.

The broadcast service may be delivered to users using a plurality of access methods. (e.g., a broadcast network or an interactive (Internet or broadband) channel). In addition, the broadcast service may target a specific user group or a specific geographical area. According to type, the service may have an interactive part and/or a broadcast-only part.

In some embodiments, there is no component which is not related to any broadcast content and is related to the function (e.g., purchase, subscription, etc.) of the service. As a part of the service guide, the service fragment may form a central hub referenced by other fragments including the schedule fragment and/or the content fragment.

Along with the fragments of the related ESG, a terminal (broadcast receiver, etc.) may check details related to the broadcast service anytime. Such details may summarize and indicate when and how related content is consumed on a user-friendly display.

The schedule fragment may define time frames capable of streaming, downloading and/or rendering related content items. That is, the schedule fragment may provide information indicating an available time interval of a service, content, etc.

The schedule fragment may include the ID, version, and valid period information of the schedule fragment. In addition, the schedule fragment may include service reference information for referencing a related service fragment and/or content reference information for referencing a related content fragment. Each of the service reference information and/or the content reference information includes ID reference information and the service fragment and the content fragment may be referenced using these IDs.

In some embodiments, the schedule fragment may reference one or more service fragments. If at least one content fragment is referenced, the schedule fragment may define valid distribution of the content items included in the service and/or a presentation time frame. That is, in some embodiments, the above-described content reference information may include presentation window information. The presentation window information may indicate a time interval when the referenced content may be rendered. The presentation window information may include a start time, an end time, a duration. ID information, etc. If the schedule fragment does not reference the content fragment, the schedule fragment may define a time frame capable of using the service.

The content fragment may provide a detailed description of a specific content item or a specific content That is, the content fragment may provide service guide information of any content. The content fragment may include ID information of the content, name information of the content, description information of the content, audio language or text language information of the content, advisor rating information of the content, genre information, service reference information of the service fragment related to the content or target user profile information. In addition, the content fragment may include ID information of the content fragment, version information, valid period information (validFrom, validTo) of the content fragment, etc.

In addition, the content fragment may include an extension element, which may include information on components included in the content. In addition, in some embodiments, this element may include information on file content items related to the content. Information on this component or file content items may include the type, role, description. ID, name or encoding method of the component or the file content items.

As described above, the content fragment may provide not only the type, description, and language information of the content but also target user group information, target geographical area information, advisory rating information, etc. The content fragment may be referenced by the schedule fragment and the service fragment related to the content may be referenced.

The SGDD (Service Guide Delivery Descriptor) may be transmitted through a service guide announcement channel. The SGDD may notify a terminal of information such as availability of data, metadata, grouping of service guide fragments, etc. in a service guide discovery process. The SGDD may enable fast identification of service guide fragments Here, the service guide fragments may be cached in a terminal or transmitted to the terminal. Therefore, the SGDD may be repeatedly transmitted if the SGDD is distributed through a broadcast channel. The SGDD may provide grouping of related service guide fragments to determine whether the group becomes perfect.

The SGDD may be used when the terminal is moved from one service coverage area to another area. In this case, the SGDD may be used to check which of the service guide fragments received in a previous area is valid even in a current area. The valid service guide fragments may not be parsed or processed again.

ESG delivery will be described.

ESG delivery may be performed through a broadcast network or broadband as described above. Such ESG delivery may be performed in a service data delivery structure using the above-described ROUTE/MMT.

Each delivery method has unique characteristics but may share a data structure used to manage organization of ESG fragments in a transport layer. This data structure may be the above-described SGDD and/or SGDU (Service Guide Delivery Unit). The above-described service guide fragments may be encapsulated into SGDUs. The SGDUs may be described by SGDDs.

The SGDU may be a transmission container for delivering the above-described service guide fragments. A broadcast system and receivers for the broadcast system may support processing of the SGDU structure. Here, the SGDU may include a unit header and/or a unit payload.

The unit header may include an extension_offset field and/or an n_o_service_guide_fragments field.

The extension_offset field may indicate an offset from a start point of the unit payload to a start point of a first extension. In the case of the SGDU according to the present invention, the value of this field may be 0. The receiver according to the present invention should process an SGDU having a non-zero value. If the SGDU having a non-zero value is received, processing may be performed by ignoring the extension.

The n_o_service_guide_fragments field may indicate the number of service guide fragments encapsulated in the SGDU.

The unit payload may include a fragmentEncoding[i] field and/or a fragmentType[i] field.

The fragmentEnoding[i] field may be a field for signaling encoding of an i-th service guide fragment. There are various encoding methods. However, in the SGDU according to the present invention, at least one service guide fragment encoded in XML may be included. The receiver according to the present invention may ignore fragment data having a service guide fragment encoded in XML in the SGDU The fragmentType[i] field may be a field for signaling the type of an i-th service guide fragment. For the service guide fragment encoded in XML, the fragment type may be one of a service fragment, a content fragment or a schedule fragment. The SGDU according to the present invention may include at least one service guide fragment corresponding to these three fragment types. The receiver according to the present invention may ignore service guide fragment data having a type other than the service guide fragment corresponding to these three fragment types.

The SGDU is a structure used to encapsulate fragment subsets for the transport layer, and may be used regardless of the transport method (transport independent). In contrast, the SGDD may be partially related to the transport method (partially transport dependent). The SGDD may describe how each service guide fragment is available in a transport layer while describing service level information of the ESG. That is, in some embodiments, the SGDD may describe information indicating how related ESG data is acquired over a broadcast network or broadband.

If the ESG is delivered over a broadcast network, ESG information may be delivered in the format of an ESG service. That is, the ESG information may be defined and delivered as an ESG service. As described above, the ESG service may be defined in the service category.

In this case, an SLT may indicate that, for the ESG service, delivery through a broadcast network of an SLS is performed through a ROUTE session. This ROUTE session may transmit an SGDD and, in some embodiments, transmit an SGDU related to the ESG. In some embodiments, these may be delivered in the form of an MME message. In some embodiments, the terminal may poll fragments.

If the ESG is delivered through broadband, the ESG information may acquire a signaling URL for an ESG server provided by the SLT Signaling URL information in the SLT was described above. Through this URL, the terminal may request all or some of the ESG fragments from the server.

Delivery mechanism through a broadcast network and broadband may deliver an SGDD (and/or SGDU) for the service guide alone. That is, a delivery session for another service guide may not deliver an SGDD and an SGDU for the service guide.

An ESG information delivery diagram through the broadcast network will be described.

First, in the shown SLT, a service identified by service_id=0x1011 may be a general broadcast service. This broadcast service may be a general broadcast service classified into a linear service by service category information on the SLT. The SLS of this service may be transmitted through a ROUTE session identified by sIP1, dIP1 and dPort1 as provided by the SLT. Specifically, this SLS may be delivered through a predefined LCT channel of the ROUTE session (LCT channel identified by the shown tsi-sls). This SLS may include information such as USBD/USD. S-TSID and MPD as described above. The session information of the S-TSID may be acquired by video/audio components for the broadcast service. In the shown embodiment, audio segments may be delivered through PLP #1-ROUTE #1-LCT (tsi-a), and video segments may be delivered through PLP #2-ROUTE #1-LCT(tsi-v).

In addition, in the shown SLT, the service identified by service_id=0x1055 may be the above-described ESG service. The service category information on the SLT may also indicate that the service is an ESG service. The transport path of the SLS for this ESG service may be provided by the SLT using the same method. This SLS may be transmitted through a ROUTE session identified by sIP2, dIP2 and dPort2 This SLS may be delivered through a predefined LCT channel in the ROUTE session (LCT channel identified by the shown tsi-sls). This SLS may include a USBD/USD and/or an S-TSID. The USB/USD may include information for referencing an S-TSID.

This S-TSID may indicate an LCT channel, through which the SGDD of the ESG service is delivered and/or an LCT channel, through which the SGDU is delivered. This may be indicated by tsi information in the S-TSID The SGDD may be delivered through an LCT channel identified by tsi-e FDT information may be delivered through a transport object identified by toi-0 of the LCT channel, and the transport object, through which the SGDD is delivered, may be identified by this FDT information. In addition, SGDUs may be delivered through an LCT channel identified by tsi-eu. FDT information may be delivered through a transport object identified by toi-0 of the LCT channel and the transport objects, through which the SGDUs are delivered, may be identified by this FDT information. In the shown embodiment, each SGDU may include a service fragment, a schedule fragment and/or a content fragment.

Like the above embodiment, one LCT channel of one ROUTE session may be used to deliver SGDDs. This LCT channel may be referred to as a service guide announcement channel. One or more different LCT channels of the ROUTE session may be used to deliver SGDUs.

The ESG service may be provided through a broadcast network according to the above-described method. In the above-described embodiment, TSI values are exemplary and the actual values of the TSI may be different.

FIG. 22 is a diagram showing transport related information included in an SGDD according to an embodiment of the present invention.

This transport related information may indicate in which path ESG data is delivered in a service data delivery structure using the above-described ROUTE/MMT.

The SGDD may further include a Transport element. This element may include shown transport related information. As described above, the ESG service may be delivered through a ROUTE protocol.

The structure of the Transport element is shown. The Transport element may indicate a transport session for delivering service guide fragments delivered in the SGDUs corresponding to this element. The Transport element may include an ipAddress attribute, a port attribute, a srcIpAddress attribute, a transmissionSessionID attribute and/or a has FDT attribute.

The ipAddress attribute may indicate the destination IP address of the ROUTE session for delivering the SGDU The port attribute may indicate the destination port number of the ROUTE session.

The srcIpAddress attribute may indicate the source IP address of the ROUTE session. If a source-specific multicast scheme is applied to transmission, this attribute may have, as a value thereof, an IP address capable of being found from IP packets included in the IP stream. If this attribute is omitted, there may be one source IP address, from which a file delivery session defined by a given destination IP address, port and transmission session is delivered.

The transmissionSessionID attribute may indicate TSI (Transmission Session Identifier) information which may be used at the LCT level. This TSI value may identify an LCT channel, through which the SGDU related to the ESG is delivered.

The hasFDT attribute may indicate whether the FDT is transmitted through the corresponding transmission session. That is, if the FDT is delivered through the transmission session in which service guide fragments are delivered, this attribute may have a "true" value. Otherwise, this attribute may have a "false" value. The default value of this attribute may be "true". If this attribute has a "false" value, FEC parameters related to the transport object for delivering SGDUs in the corresponding transmission session may be signaled by EXT_FTI of RFC 3926. In addition, information on optional compression of SGDUs may be signaled using EXT_CENC of RFC 3926. The EXT_CENC may be generally defined to signal encoding of the FDT but may be defined to be used for another purpose for a specific SGDU delivery scheme using ALC.

FIG. 23 is a diagram showing a service/content identification message format according to another embodiment of the present invention.

As described above, a service/content identification message may be delivered through the Websocket. The service/content identification message may be used for the above-described communication for service/content identification.

In the service/content identification message according to the shown embodiment, a CARatings element and/or a TimelineInfo element are omitted. In addition, FileContentItem elements are not distinguished from Component elements and thus are handled as Component elements. In addition, the internal information of the Component element was omitted. In some embodiments, the structure of the service/content identification message and/or the internal information may be added/changed/deleted.

The service/content identification message according to the above-described embodiment and the shown embodiment may be generated based on the information on the above-described ESG. That is, the PD may receive the ESG using a reception component through a broadcast network or broadband. When a new ESG is received, the PD may deliver the service/content identification message to the CD apps subscribing to communication for service/content identification. The PD may generate a service/content identification message, for communication for service/content identification. At this time, the service/content identification message may include information extracted from the ESG. In some embodiments, the PD may further include supplementary information in the service/content identification message, without including the information extracted from the ESG. To this end, the service/content identification message may be generated.

In the service/content identification message according to the above-described embodiment and the shown embodiment, the service element may include all or some of the information in the service fragment of the above-described ESG. In some embodiments, the service element may include the service ID information, the service type information, the service name information, the service description information and/or the target user profile information of the service among the service fragment information of the ESG. These may correspond to the id element, the ServiceType element, the Name element, the Description element and/or the TargetUserProfile element in the above-described service element. That is, in the process of generating the service/content identification message, the above-listed information of the service fragments of the ESG may be selected and included in the service/content identification message.

In the service/content identification message according to the above-described embodiment and the shown embodiment, the content element may include all or some of the information in the content fragments of the above-described ESG In some embodiments, the content element may include ID information of the content, name information of the content, description information of the content, rating information of the content, and/or capability information of the content. These may correspond to a Programid element, a Name element, a Description element, a TargetUserProfile element, a CARatings element and/or a Capabilities element in the above-described content element.

In addition, as described above, the content fragment of the ESG may include an extension element, and the extension element may include a component included in the content and/or information related to a file content item. This information may also be acquired from the ESG to be included in the service/content identification message. Information in the above-described Component element and/or FileContentItem element may be acquired from the information in the ESG. Information such as an ID, type, role, name, etc. of each component and/or file content item may be included in @componentID, @componentType, @componentRole, @componentName or @FileContentItemID, @FileContentItemType, @FileContentItemEncoding, @FileContentItemName, etc.

That is, in the process of generating the service/content identification message, the above-listed information of the content fragments of the ESG may be selected and included in the service/content identification message.

In addition, in addition to the information acquired from the received ESG, other information may be included in the service/content identification message. The above-described @componentLocation information may be included in the Component element. In addition, the above-described @FileContentItemLocation information may be included in the FileContentItem element. In addition, the above-described Location element may be included in the Content element. Each piece of location information may be equal to the above-described location information.

Such location information and URL information included therein may be used for communication for the above-described service/show/segment related data delivery.

In addition, timeline related information of content may be additionally included in the service/content identification message. This timeline information may not be acquired from the ESG. This timeline information may correspond to the above-described TimelineInfo element and may be equal to the above-described timeline information.

Although not shown, filtering criteria information of the service/content may be included in the service/content identification message. The filtering criteria may be criteria used for personalization or parental control.

In communication for the above-described current service information delivery, the above-described current service information message may include an ESGInfo element, a Components element, a FileContentItem element and/or a TimelineInfo element. At this time, the above-listed elements included and delivered in the current service information message may include information corresponding to the elements of the above-described service/content identification message.

That is, the ESGInfo element requested by setting ServiceInfoType [0] to 1 may include the service element of the service/content identification message and sub-elements thereof. In addition, the ESGInfo element may include id. Name. Deception. and CARatings sub-elements of the Content element of the service/content identification message.

The Components element requested by setting ServiceInfoType [1] to 1 may include the Component element of the service/content identification message and sub-elements thereof.

The FileContentItem element requested by setting ServiceInfoType [2] to 1 may include the FileContentItem element of the service/content identification message and sub-elements thereof.

The TimelineInfo element requested by setting ServiceInfoType [3] to 1 may include the TimelineInfo element of the service/content identification message and sub-elements thereof.

In acquisition of information related to the ESG or the service/content, as described above, there is a method of using communication for service/content identification or a method of using communication for current service information delivery.

When the ESG information is received, the PD may notify the CD apps of the service/content identification message using Websocket connection, thereby delivering the information to the CD. In addition, the CD may acquire necessary information through an HTTP request and response, if necessary. By defining an information delivery method using such two protocols, information delivery between the PD and the CD may be efficiently performed. In particular, although subscription of the CD app is performed after a notification time through Websocket connection, necessary information may be delivered.

FIG. 24 is a diagram showing ESGRequesttype parameters which may be used for communication for ESG delivery according to another embodiment of the present invention.

The above-described ESG message format (t24010) may include a PDService element, a PDSchedule element and/or a PDContent element. These elements may correspond to the service fragment, schedule fragment and content fragment of the above-described ESG. That is, the fragment information of the related ESG may be included in each ESG message format to be delivered to the CD.

In addition, in communication for the above-described ESG delivery, ESG information may be requested from the PD and delivered to the CD according to the ESGRequesttype parameter value. In the above-described embodiment, the ESGRequesttype parameter value is 0, 1 and 2.

The shown embodiment (t24020) may be an extension of the above-described ESGRequesttype parameter. The ESGRequesttype parameter values of 0, 1 and 2 are equal to those of the above-described embodiment.

If the ESGRequesttype parameter value is 3, this may mean that only filtered ESG information of the ESG information of the current show is requested. Here, the filtered ESG information may mean ESG information filtered according to device capability and/or parental control setting of the PD in the ESG information received by the PD In some embodiments, the filtered ESG information may mean ESG information filtered according to device capability and/or parental control setting of the CD in the ESG information received by the PD. The filtered ESG information may be delivered to the CD, thereby preventing unnecessary information from being delivered to the CD. The ESG information of the current show may include the Service, Schedule. and Content fragments of the ESG of the current show. Here, the show may mean broadcast content, a program, etc.

If the ESGRequesttype parameter value is 4, this may mean that only filtered ESG information of the ESG information of the current service is requested. The meaning of the filtered ESG information may be equal to that of the above-described filtered ESG information. The ESG information of the current service may include the Service, Schedule, and Content fragments of the ESG of the current virtual channel.

If the ESGRequesttype parameter value is 5, this may mean that only filtered ESG information of all the ESG information of all available services is requested. The meaning of the filtered ESG information may be equal to that of the above-described filtered ESG information. All the ESG information may include the Service. Schedule, and Content fragments of the ESGs of all virtual channels, through which the ESG may be transmitted, in some embodiments.

In some embodiments, the ESGRequesttype parameter values of 3, 4 and 5 may not be defined. In addition, in some embodiments, the ESGRequesttype parameter values of 0, 1 and 2 may not be defined.

In addition to communication for service/content identification and communication for current service information delivery, communication for ESG delivery is defined. Using communication for ESG delivery, the CD app may acquire ESG information according to situation. ESG related information may be delivered through various protocols, thereby generally using data in various CD apps and selecting an efficient delivery method according to situation.

Communication according to Websocket notifies the CD apps of information and may be referred to as a notification service. For example, for communication for service/content identification, the CD app may subscribe to a service/content identification notification service and the PD may deliver the service/content identification message to a CD app having valid subscription.

FIG. 25 is a diagram showing a method of processing a broadcast service at a PD according to an embodiment of the present invention.

The method of processing the broadcast service at the PD according to the embodiment of the present invention may include performing a discovery process with a CD app, establishing Websocket connection, receiving a subscription message for subscription to a service identification notification service, receiving an electronic service guide (ESG), generating a service identification message and/or delivering a service identification message to the CD app subscribing to the service identification notification service through Websocket connection.

First, the companion manager of a broadcast reception device operating as the PD may perform the discovery process with the CD app (application) which is being launched in a companion device (CD). In this process, endpoint information of a Websocket server may be delivered from the PD to the CD app. The Websocket server is a server in the PD and may perform the above-described operation. In some embodiments, in this process, the endpoint information of the web server may be delivered from the PD to the CD app. The web server is a server in the PD and may perform the above-described operation.

This discovery process may be equal to the above-described discovery process. In some embodiments, the CD app may not be launched by the PD. The CD may multicast an M-SEARCH message. The PD, which has received this message, may send a 200 OK message as a response. The header of the 200 OK message may include the LOCATION URL information of the PD.

The CD app may request a device description from this Location URL. This request may be performed using an HTTP GET method. The PD or the companion manager of the PD, which has received this request, may transmit a first response message to the CD app. Here, the first response message may include URL information used as a web server endpoint in a header thereof. Here, the endpoint of the web server may mean a service URL provided by the above-described web server.

The companion manager of the PD may receive an application information request from the CD app. The CD app may request application information from the received URL. The companion module may transmit a second response message as a response. The second response message may include URL information used as the endpoint of the Websocket server in a body thereof. The companion manager may correspond to the above-described CD manager.

The present embodiment may correspond to the embodiment, in which the PD provides an HTTP based web server and a Websocket based server, among the above-described embodiments. Particularly, the present embodiment may correspond to an embodiment in which only one companion service URL is provided as an HTTP service URL and one companion endpoint and one app-to-app endpoint are provided as a Websocket server endpoint. Here, the Websocket companion endpoint may provide other functions excluding app-to-app communication. Communication between the PD and the CD may be performed by the web server or the Websocket server through division of roles. For example, ESG delivery may be performed by the web server and service and content identification, emergency alert (EA) message delivery and media playback information delivery may be performed by the Websocket server Media timeline information may be delivered through the web server and/or the Websocket server.

Thereafter, the companion manager of the PD may establish Websocket connection between the Websocket server and the CD app. In this process, the above-described Websocket server endpoint may be used. A method of establishing Websocket connection (session) was described above in detail.

The Websocket server of the PD may receive a subscription message from the CD app. This subscription message may be delivered to the above-described Websocket endpoint. This subscription message may subscribe to a service identification notification service for receiving a service/content identification message including information derived from the ESG. The service identification notification service may be a PD-CD notification service related to the above-described service/content identification. Through this process, the CD app may subscribe to the notification service.

The reception component of the PD may receive ESG information through a broadcast network or broadband. The reception component may include one or both of a tuner for receiving data through the broadcast network or a network interface for receiving data through broadband. The ESG may include service guide information related to broadcast services provided by the PD.

The internal process of the PD may generate a service identification message for a service identification notification service using the received ESG. This service identification message may correspond to the above-described service/content identification message.

The Websocket server of the PD may deliver a service identification message to the CD app which subscribes to the service identification notification service through Websocket connection. This delivery may be performed in the form of a notification message of the above-described Websocket protocol. This notification may be performed when the ESG information is updated, when the ESG information is newly received or when information included in the service/content identification message is changed. In addition, this notification may be periodically performed in some embodiments.

Here, the reception component, the Websocket server, the web server, the internal processor, and the companion manager may be hardware elements.

In a method of processing a broadcast service at a PD according to another embodiment of the present invention, the generating of the service identification message may include including information extracted from an ESG in the service identification message. The service identification message may include at least one service element or at least one content element.

The at least one service element may include service ID information, service type information, service name information or service description information of the service fragment information of the ESG having service guide information of the broadcast service. That is, the service element of the service identification message may be generated using the above-listed information of the service fragment information of the ESG.

At least one content element may include content ID information, content name information, content description information or content capability information of the content fragment information of the ESG having service guide information of the broadcast content. That is, the content element of the service identification message may be generated using the above-listed information of the content fragment information of the ESG.

In the method of processing the broadcast service at the PD according to another embodiment of the present invention, at least one content element may include at least one component element, at least one file content item element or a timeline element.

At least one component element may describe information on a component included in the broadcast content. Here, the component may mean one of an audio, video, closed caption or application component of the broadcast content.

At least one file content item element may describe information on the file content item included in the broadcast content. Here, the file content item may mean supplementary data of the broadcast content.

The timeline element may describe the current time information of the broadcast content. In some embodiments, the temporal location of the broadcast content at the current time may be indicated.

In the method of processing the broadcast service at the PD according to another embodiment of the present invention, the generating of the service identification message may further include including location information in the service identification message. Here, the location information may mean URL information for acquiring the file content item or the component from the PD at the CD.

First URL information for enabling the CD app to access the component may be included in the above-described at least one component element. Second URL information for enabling the CD app to access the file content item may be included in the above-described at least one file content item element.

The method of processing the broadcast service at the PD according to another embodiment of the present invention may include receiving an HTTP GET message for requesting the component or the file content item through the first URL or second URL from the CD app and delivering the requested component or the file content item to the CD app. This may be operation related to communication for service/show/segment data delivery.

In the method of processing the broadcast service at the PD according to another embodiment of the present invention, the PD may further provide the web server endpoint of the PD to the CD app in the discovery process. This was described in the discovery process. In the method of processing the broadcast service at the PD, the PD may receive the HTTP GET message from the CD app through the web server endpoint. This HTTP GET message may individually request the information corresponding to the above-described service identification message.

This HTTP GET message may request at least one of a service element of a current broadcast service among the service elements, a component element of a currently available component among the component elements, or a file content item element of a currently available file content item among the file content item elements of the above-described service identification message. The PD may deliver the information requested by the HTTP GET message to the CD app. This process may be related to communication for current service information delivery.

In the method of processing the broadcast service at the PD according to another embodiment of the present invention, the PD may receive an HTTP GET message from the CD app through the web server endpoint. This HTTP GET message may request ESG information in various formats. This HTTP GET message may request at least one of ESG information of a broadcast service currently provided by the PD. ESG information of broadcast content currently provided by the PD or full ESG information of available broadcast services. The PD may deliver the information requested by the HTTP GET message to the CD app. This process may be related to communication for ESG information delivery.

A method of processing a broadcast service at a CD according to one embodiment of the present invention will be described. This method is not shown in the drawing.

The method of processing the broadcast service at the CD according to the embodiment of the present invention, a launcher of the CD launching an app of the CD, the app of the CD performing a discovery process with a PD using a network interface of the CD, the app of the CD establishing Websocket connection with a Websocket server of the PD using a Websocket client of the CD, the CD app transmitting a subscription message for receiving a service/content identification message using the Websocket client of the CD to subscribe to the service, and/or the CD app receiving a service identification service using the Websocket client of the CD. The discovery process between the CD app and the PD may be performed by the companion module of the CD The CD app may request a device description using the companion module, request application information from the above-described endpoints, and acquire responses to the requests. In addition, the CD app may send an HTTP request/response to the web server of the PD using the network interface of the CD according to situation.

The methods of processing the broadcast service at the CD according to the embodiments of the present invention may correspond to the methods of processing the broadcast service at the PD according to the above-described embodiments of the present invention. The methods of processing the broadcast service at the CD may be performed by hardware elements (e.g., the companion module, the launcher, the Websocket client, the network interface, etc.) corresponding to the hardware elements used in the method of processing the broadcast service at the PD. The method of processing the broadcast service at the CD may have embodiments corresponding to the embodiments of the method of the processing the broadcast service at the PD.

The above-described steps may be omitted or replaced by other steps of performing similar/equal operations in some embodiments.

Figure 26:
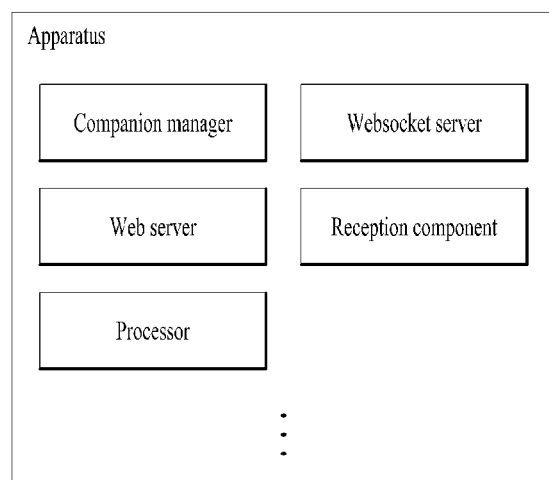
FIG. 26 is a diagram showing a broadcast reception apparatus operating as a PD according to an embodiment of the present invention.

FIG. 26 is a diagram showing a broadcast reception apparatus operating as a PD according to an embodiment of the present invention.

The broadcast reception apparatus operating as the PD according to the embodiment of the present invention ma include the above-described companion manager, the Websocket server, the web server, the reception component and the processor (internal processor). The blocks and modules were described above.

The broadcast reception apparatus operating as the PD according to the embodiment of the present invention and the modules and blocks included therein may perform the embodiments of the method of processing the broadcast service at the PD of the present invention.

A device operating as the CD according to the embodiment of the present invention will be described. This device is not shown in the drawing.

The device operating as the CD according to the embodiment of the present invention ma include the above-described companion module, the launcher, the Websocket client and/or the network interface. The blocks and modules were described above.

The device operating as the CD according to the embodiment of the present invention and the modules/blocks included therein may perform the embodiments of the method of processing the broadcast service at the CD of the present invention.

The blocks/modules included in the device may be hardware elements for performing consecutive processes stored in a memory.

The above-described modules may be omitted or replaced by other modules for performing similar/equal operations in some embodiments.

FIG. 27 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 1.

TABLE 1

| Value | PHY profile |
| --- | --- |
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 2.

TABLE 2

| Value | FFT size |
| --- | --- |
| 00 | 8K FFT |
| 01 | 16K UT |
| 10 | 32K FFT |
| 11 | Reserved |

GI_FRACTION: This 3 bit field indicates the guard interval fraction value in the current super-frame, as described in below table 3.

TABLE 3

| Value | GI_FRACTION |
| --- | --- |
| 000 | $1/5$ |
| 001 | $1/10$ |
| 010 | $1/20$ |
| 011 | $1/40$ |
| 100 | $1/80$ |
| 101 | $1/160$ |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 4.

TABLE 4

|  | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 28 illustrates a time interleaving according to an embodiment of the present invention.

FIGS. 28(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group(n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 5.

TABLE 5

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1' ($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate seffices. This option is signaled in the PLS2-STAT by DP_TI_TYPE = '1'. |
| Option-3 | Each TI group is divided into multiple TI blocks and is mapped directly to one frame as shown in (c), Each TI block may use full TI memory, so as to provide the maximum bit-rate for a DP. This option is signaled in the PLS2-STAT signaling by DP_TI_TYPE = V and DP_TI_LENGTH = $N_{TI}$, while $P_I$ = 1, |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n, s)$.

FIG. 29 illustrates the basic operation of a twisted row-column block interleaver according to an embodiment of the present invention.

FIG. 29(a) shows a writing operation in the time interleaver and FIG. 29(b) shows a reading operation in the time interleaver. The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, . . . , $N_r$, $N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as following equation.

$$\text{GENERATE}(R_{n,s,i}, C_{n,s,i}) = \qquad \text{[Equation 1]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$ and it is determined by $N_{xBLOCK\_TI\_MAX}$ given in the PLS2-STAT as following equation.

$$\text{[Equation 2]}$$
$$\text{for}$$
$$\begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases},$$
$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

Figure 30:
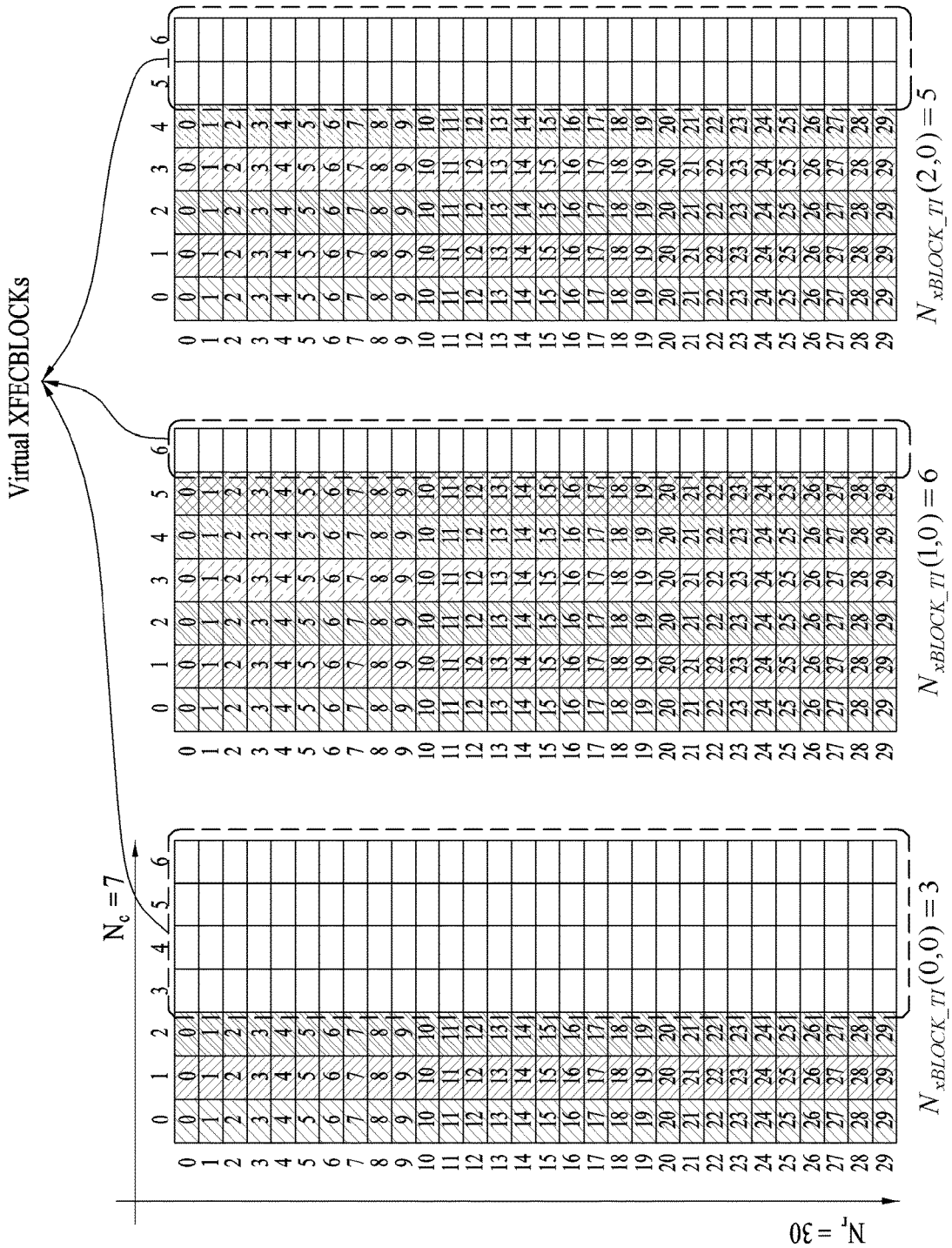
FIG. 30 illustrates an operation of a twisted row-column block interleaver according to another embodiment of the present invention.

FIG. 30 illustrates an operation of a twisted row-column block interleaver according to another embodiment of the present invention.

More specifically, FIG. 30 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s) = N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ inserting the virtual XFEC-BLOCKs into the TI memory and the reading process is accomplished as following equation.

$$p = 0; \qquad \text{[Equation 3]}$$
$$\text{for } i = 0; i < N_{cells} N'_{xBLOCK\_TI\_MAX}; i = i + 1$$
$$\{\text{GENERATE}(R_{n,s,i}, C_{n,s,i});$$
$$V_i = N_r C_{n,s,j} + r_{n,s,j}$$
$$\quad \text{if } V_i < N_{cells} N_{xBLOCK\_TI}(n,s)$$
$$\quad \{$$
$$\qquad Z_{n,s,p} = V_i; p = p + 1;$$
$$\quad \}$$
$$\}$$

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

Figure 31:
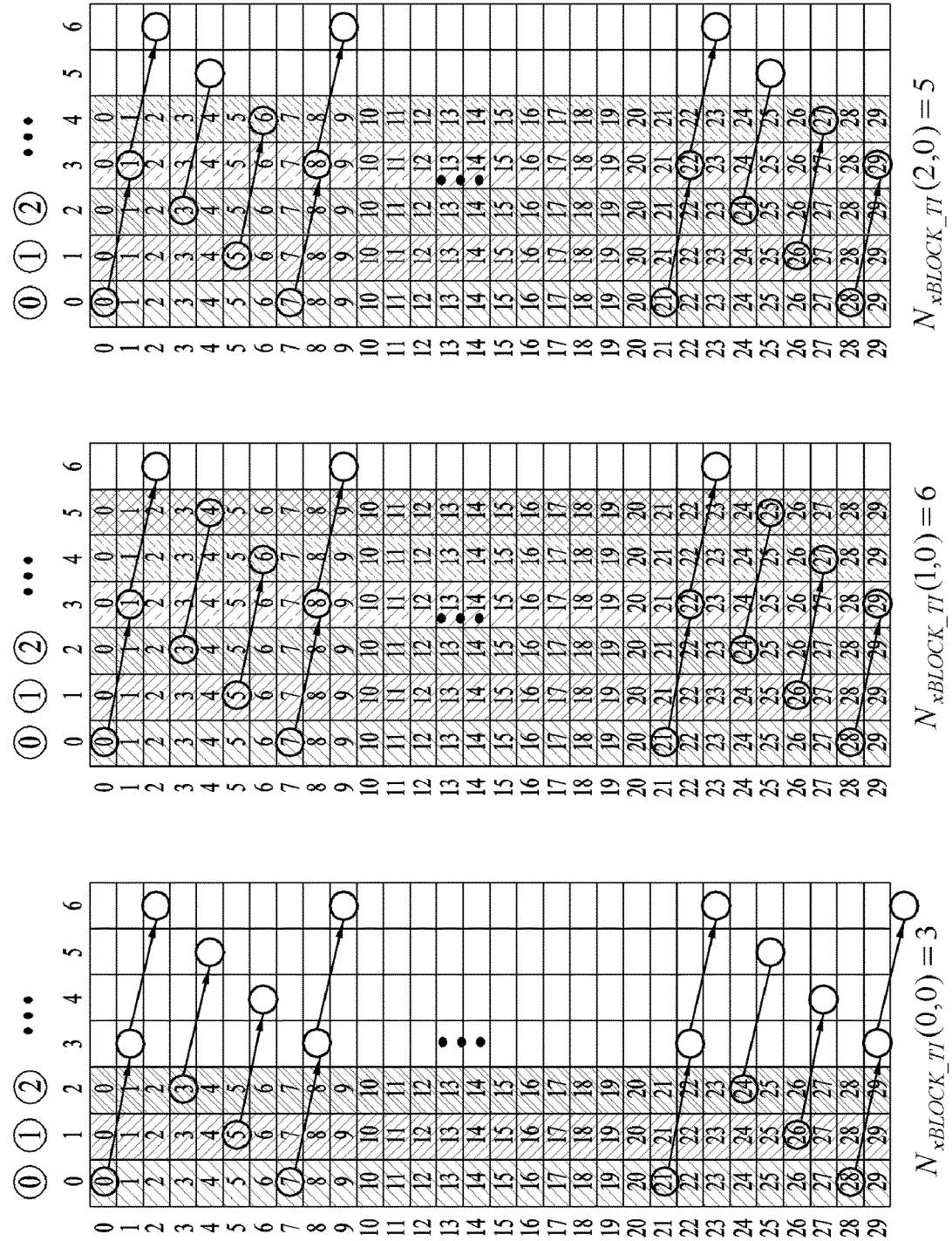
FIG. 31 illustrates a diagonal-wise reading pattern of a twisted row-column block interleaver according to an embodiment of the present invention.

FIG. 31 illustrates a diagonal-wise reading pattern of a twisted row-column block interleaver according to an embodiment of the present invention.

More specifically FIG. 31 shows a diagonal-wise reading pattern from each interleaving array with parameters of $N_{xBLOCK\_TI\_MAX}'=7$ and Sshift=(7−1)/2=3. Note that in the reading process shown as pseudocode above, if $V_i \geq N_{cells} N_{xBLOCK\_TI}(n,s)$, the value of Vi is skipped and the next calculated value of Vi is used.

Figure 32:
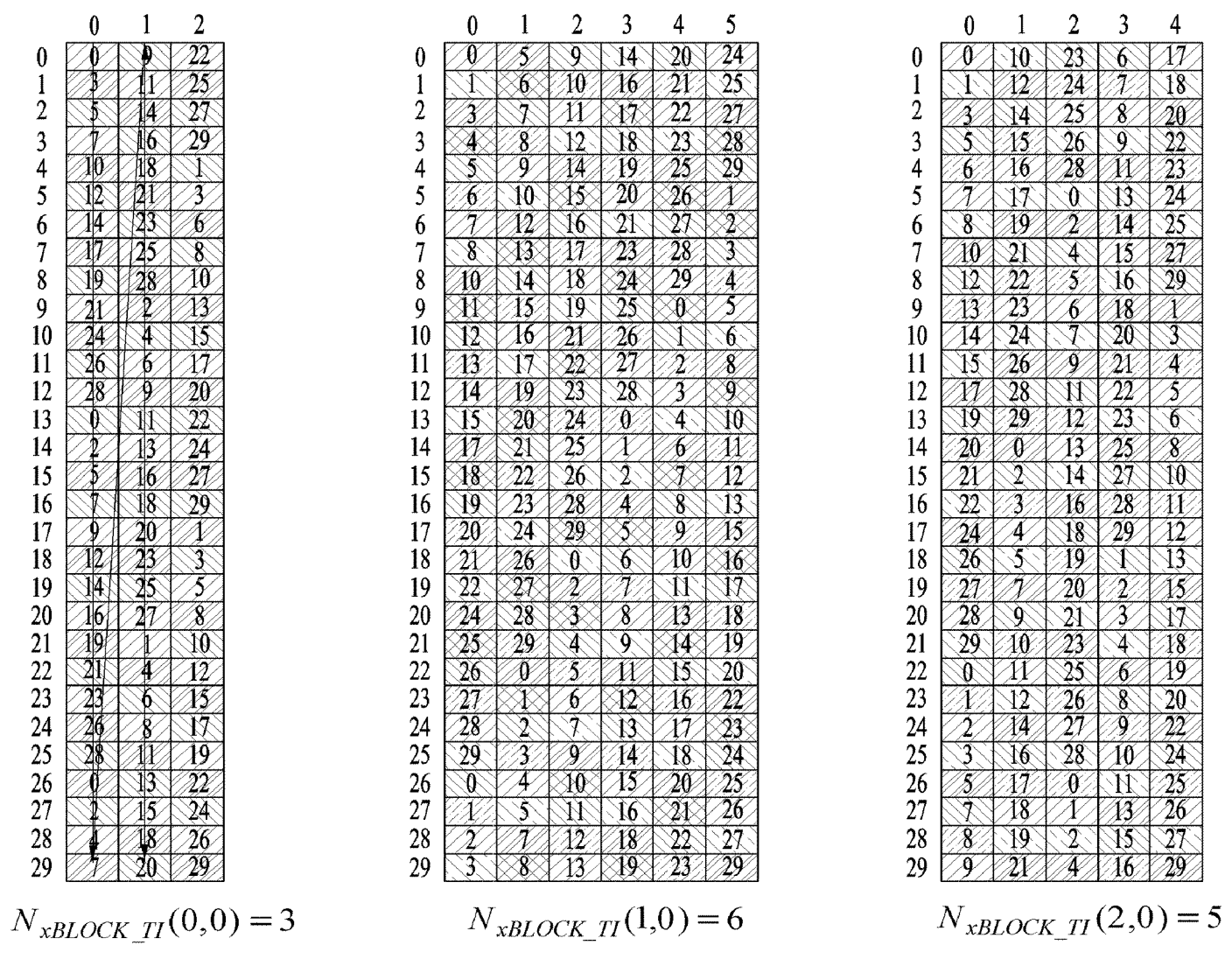

FIG. 32 illustrates interleaved XFECBLOCKs from each interleaving array according to an embodiment of the present invention.

FIG. 32 illustrates the interleaved XFECBLOCKs from each interleaving array with parameters of $N_{xBLOCK\_TI\_MAX}'=7$ and Sshift=3.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method for processing a broadcast service at a Primary Device (PD), the method comprising:
    performing, by a companion manager of the PD, a discovery process with a Companion Device (CD) application in a CD by receiving a discovery request from the CD and providing an endpoint for a WebSocket server of the PD;
    handling, by the WebSocket server, a connection established by the CD application based on the endpoint;
    in response to receiving a query for a current service from the CD, transmitting, by the WebSocket server, a response including information identifying the current service to the CD application based on the connection;
    receiving, by a tuner, a broadcast signal having signaling information including flag information to obtain emergency data in the broadcast signal;
    time de-interleaving, by a time de-interleaver, Forward Error Correction (FEC) blocks including the emergency data based on a Time Interleaving (TI) block,
    wherein the FEC blocks are de-interleaved based on positions for the FEC blocks and one or more virtual FEC blocks that are skipped,
    wherein the signaling information further includes information for a maximum number for the FEC blocks; and
    transmitting, by the Websocket server, a notification message including the emergency data to the CD.

2. The method of claim 1, wherein the response and the notification message are delivered with a JavaScript Object Notation (JSON) format.

3. The method of claim 1, further comprising:
    parsing a Service List Table (SLT) in the broadcast signal, the SLT providing information for discovering Service Layer Signaling (SLS); and
    acquiring an electronic service guide (ESG) based on the SLT via: a broadcast network through a Real Time Delivery Over Unidirectional Transport (ROUTE) session, or a broadband by requesting an ESG fragment from an ESG server, the SLT including a signaling Uniform Resource Locator (URL) for the ESG server.

4. The method of claim 1, further comprising:
    in response to changing of the current service, transmitting a notification message for the changed current service to the CD application.

5. A device for processing a broadcast service, the device comprising:
    a Companion Device (CD) manager that:
    performs a discovery process with a CD application in a CD by receiving a discovery request from the CD and providing an endpoint for a WebSocket server of the device;
    the Websocket server that handles a connection established by the CD application based on the endpoint;
    a tuner that receives a broadcast signal having signaling information including flag information to obtain emergency data in the broadcast signal;
    a time de-interleaver that performs time de-interleaving on Forward Error Correction (FEC) blocks including the emergency data based on a Time Interleaving (TI) block,
    wherein the FEC blocks are de-interleaved based on positions for the FEC blocks and one or more virtual FEC blocks that are skipped,
    wherein the signaling information further includes information for a maximum number for the FEC blocks,
    wherein the Websocket server transmits a notification message including the emergency data to the CD, and
    wherein the Websocket server further transmits a response including information identifying a current service to the CD application based on the connection in response to receiving a query for the current service from the CD.

6. The device of claim 5, wherein the response and the notification message are delivered with a JavaScript Object Notation (JSON) format.

7. The device of claim 5, further comprising:
    a Service List Table parser configured to parse a Service List Table (SLT) in the broadcast signal to obtain an electronic service guide (ESG) based on the SLT via: a broadcast network through a Real Time Delivery Over Unidirectional Transport (ROUTE) session, or a broadband by requesting an ESG fragment from an ESG server, the SLT including a signaling Uniform Resource Locator (URL) for the ESG server, wherein the SLT providing information for discovering Service Layer Signaling (SLS).

8. The device of claim 5, wherein the Websocket server further transmits a notification message for changed current service to the CD application in response to changing of the current service.

* * * * *

UNITED STATES PATENT AND TRADEMARK OFFICE
CERTIFICATE OF CORRECTION

| | |
|---|---|
| PATENT NO. | : 11,228,385 B2 |
| APPLICATION NO. | : 17/155948 |
| DATED | : January 18, 2022 |
| INVENTOR(S) | : Seungryul Yang et al. |

It is certified that error appears in the above-identified patent and that said Letters Patent is hereby corrected as shown below:

In the Claims

<u>Column 61, Line 48, Claim 1:</u>
Change: "information including flag information to obtain"
To: -- information including flag information related to obtain --

<u>Column 61, Lines 56 and 57, Claim 1:</u>
Change: "information for a maximum number for the FEC blocks; and"
To: -- information related to a maximum number for the FEC blocks; and --

<u>Column 62, Line 25, Claim 5:</u>
Change: "information including flag information to obtain"
To: -- information including flag information related to obtain --

<u>Column 62, Lines 34 and 35, Claim 5:</u>
Change: "information for a maximum number for the FEC blocks,"
To: -- information related to a maximum number for the FEC blocks, --

Signed and Sealed this
Fourteenth Day of March, 2023

Katherine Kelly Vidal
*Director of the United States Patent and Trademark Office*